US012752540B2

(12) United States Patent
Watanabe et al.

(10) Patent No.: US 12,752,540 B2
(45) Date of Patent: Oct. 6, 2026

(54) INK REFILL CONTAINER

(71) Applicant: SEIKO EPSON CORPORATION, Tokyo (JP)

(72) Inventors: Tadashi Watanabe, Matsumoto (JP); Tadahiro Mizutani, Shiojiri (JP); Yoshihiro Koizumi, Shiojiri (JP); Yuta Koike, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 223 days.

(21) Appl. No.: 18/667,144

(22) Filed: May 17, 2024

(65) Prior Publication Data

US 2024/0383254 A1 Nov. 21, 2024

(30) Foreign Application Priority Data

May 18, 2023 (JP) ................................ 2023-082118

(51) Int. Cl.
*B41J 2/175* (2006.01)

(52) U.S. Cl.
CPC ....... *B41J 2/17509* (2013.01); *B41J 2/17596* (2013.01)

(58) Field of Classification Search
CPC .... B41J 2/175; B41J 2/17503; B41J 2/17506; B41J 2/17509; B41J 2/17513; B41J 2/17523; B41J 2/1754; B41J 2/17553; B41J 2/17596; B41J 29/13
See application file for complete search history.

(56) References Cited

U.S. PATENT DOCUMENTS

| | | | | |
|---|---|---|---|---|
| 10,350,901 | B2 * | 7/2019 | Mizutani | B41J 2/17553 |
| 11,584,132 | B2 | 2/2023 | Nagai et al. | |
| 2018/0250944 | A1 * | 9/2018 | Ishizawa | B65D 1/0246 |
| 2022/0016893 | A1 | 1/2022 | Nagai et al. | |
| 2023/0109391 | A1 | 4/2023 | Mizutani et al. | |

FOREIGN PATENT DOCUMENTS

| | | | |
|---|---|---|---|
| EP | 3 939 794 | A1 | 1/2022 |
| EP | 4 159 448 | A1 | 4/2023 |
| JP | 2022-018712 | A | 1/2022 |
| JP | 2023-051714 | A | 4/2023 |

* cited by examiner

*Primary Examiner* — Anh T Vo
(74) *Attorney, Agent, or Firm* — Oliff PLC

(57) ABSTRACT

An ink refill container for refilling a printer with ink, includes: a container body; an ink-outlet forming portion including a tubular portion and a valve located in an ink outlet; and a cap configured to be detachably attached to the ink-outlet forming portion. The cap includes an inner top-surface portion. The inner top-surface portion includes a center protrusion configured to push the valve to open the valve, an annular protrusion configured to be in contact with the tubular portion to seal the tubular portion, and at least one of an annular peripheral wall portion and a plurality of ribs. A gap between the center protrusion and the peripheral wall portion or each of gaps between the ribs has a shape of a recess. The recess has a bottom on the inner top-surface portion side and an opening open toward the ink-outlet forming portion and is configured to hold ink.

9 Claims, 15 Drawing Sheets

INK REFILL CONTAINER

The present application is based on, and claims priority from JP Application Serial Number 2023-082118, filed May 18, 2023, the disclosure of which is hereby incorporated by reference herein in its entirety.

BACKGROUND

1. Technical Field

The present disclosure relates to an ink refill container.

2. Related Art

Ink jet printers configured to perform printing on a print medium with ink by ejecting ink from a print head toward a print medium such as a printing sheet have been known as an example of an ink eject apparatus. Some such ink jet printers are of ink refill types in which ink tanks are refilled with ink for use. JP-A-2022-18712 discloses an ink refill container used for refilling an ink tank of an ink refill type with ink.

An ink refill container may experience an increase in internal pressure due to changes in temperature and/or atmospheric pressure. For the ink refill container in JP-A-2022-18712, when the lid is opened in such a case, seals of a first sealing portion and a second sealing portion are released at the same time, and the inside of the container communicates with the atmosphere. The release of the internal pressure can cause ink to spill out, and the ink can leak outside the ink refill container. In addition, spilling-out of ink can contaminate an ink-outlet forming portion of the ink refill container serving as an ink outlet.

SUMMARY (1) A first aspect of the present disclosure provides an ink refill container for refilling a printer with ink. The ink refill container includes: a container body configured to store ink; an ink-outlet forming portion connected to the container body and including a tubular portion having an ink outlet that enables the ink to flow out and a valve located at the ink outlet; and a cap configured to be detachably attached to the ink-outlet forming portion, the cap includes an inner top-surface portion configured to face the ink outlet in an attached state in which the cap is attached to the ink-outlet forming portion, when a direction parallel to a center axis of the ink refill container in the attached state is defined as an axial direction, the inner top-surface portion includes a center protrusion protruding from the inner top-surface portion toward the ink-outlet forming portion in the axial direction and configured to push the valve to open the valve in the attached state, an annular protrusion located outside the center protrusion in radial directions with respect to the center protrusion, the annular protrusion, in the attached state, protruding from the inner top-surface portion toward the ink-outlet forming portion in the axial direction and including a cap-side sealing portion configured to be in contact with the tubular portion to seal the tubular portion, and at least one of an annular peripheral wall portion and a plurality of ribs, the peripheral wall portion being located between the center protrusion and the annular protrusion in the radial directions and having a height lower than a distal end of the center protrusion, the plurality of ribs being located between the center protrusion and the cap-side sealing portion in the radial directions and having a height lower than the distal end of the center protrusion, and a gap between the center protrusion and the peripheral wall portion or each of gaps between the ribs has a shape of a recess, and the recess has a bottom on the inner top-surface portion side and an opening open toward the ink-outlet forming portion and is configured to hold the ink.

(2) A second aspect of the present disclosure provides an ink refill container for refilling a printer with ink. The ink refill container includes: a container body configured to store ink; an ink-outlet forming portion connected to the container body and including a tubular portion having an ink outlet that enables the ink to flow out and a valve located at the ink outlet; and a cap configured to be detachably attached to the ink-outlet forming portion, the cap includes an inner top-surface portion configured to face the ink outlet in an attached state in which the cap is attached to the ink-outlet forming portion, when a direction parallel to a center axis of the ink refill container in the attached state is defined as an axial direction, the inner top-surface portion includes a center protrusion configured to push the valve to open the valve in the attached state and a large diameter portion located on the inner top-surface portion side relative to a distal end portion of the center protrusion in the axial direction and having an outer circumferential shape larger than the center protrusion, the valve includes a valve member, a sealing member configured to be in contact with the valve member in a valve closed state of the valve, and a spring member configured to urge the valve member toward the sealing member in the valve closed state, the sealing member includes a cylindrical portion extending in the axial direction and an elastic membrane portion extending from an inner circumferential wall of the cylindrical portion toward the center axis, having a through hole at center corresponding to the center axis, and separated by slits extending from the through hole toward the inner circumferential wall in radial directions, the center protrusion in the attached state extends through the through hole and pushes the valve member to put the valve in a valve open state, and a distal end of the large diameter portion in the attached state is in contact with at least part of the elastic membrane portion.

(3) A third aspect of the present disclosure provides an ink refill container for refilling a printer with ink. The ink refill container includes: a container body configured to store ink; an ink-outlet forming portion connected to the container body and including a tubular portion having an ink outlet that enables the ink to flow out and a valve located at the ink outlet; and a cap configured to be detachably attached to the ink-outlet forming portion and configured to be removed upward in an attached state in which the cap is attached to the ink-outlet forming portion and in a state in which the ink outlet faces upward, the cap includes an inner top-surface portion configured to face the ink outlet in the attached state in which the cap is attached to the ink-outlet forming portion and an inner annular protrusion protruding from the inner top-surface portion downward and including an inner sealing portion configured to be in contact with an inside of the tubular portion in the attached state and in the state in which the ink outlet faces upward, the ink-outlet forming portion includes a first fitting portion recessed or protruding from an upper end surface of the tubular portion in the attached state and in the state in which the ink outlet faces upward, and the cap includes a second fitting portion configured to fit into the first fitting portion in the attached state, and the second fitting portion is located outside the inner annular protrusion in radial directions of the tubular portion.

(4) A fourth aspect of the present disclosure provides an ink refill container for refilling a printer with ink. The ink refill container includes: a container body configured to store ink; an ink-outlet forming portion connected to the container body and including a tubular portion having an ink outlet that enables the ink to flow out and a valve located at the ink outlet; and a cap configured to be detachably attached to the ink-outlet forming portion, the cap includes an inner top-surface portion configured to face the ink outlet in an attached state in which the cap is attached to the ink-outlet forming portion and a tubular inner side-surface portion extending in a direction intersecting the inner top-surface portion, when a direction parallel to a center axis of the ink refill container in the attached state is defined as an axial direction, the inner top-surface portion includes a center protrusion configured to push the valve to open the valve in the attached state and an annular protrusion located outside the center protrusion in radial directions with respect to the center protrusion, the annular protrusion, in the attached state, protruding from the inner top-surface portion toward the ink-outlet forming portion in the axial direction and including a cap-side sealing portion configured to be in contact with the tubular portion to seal the tubular portion, and an ink holding portion away from the ink-outlet forming portion is located in at least one of the inner side-surface portion and a portion of the inner top-surface portion, the portion being located radially outside the annular protrusion.

DESCRIPTION OF EMBODIMENTS

A. First Embodiment

Figure 1:
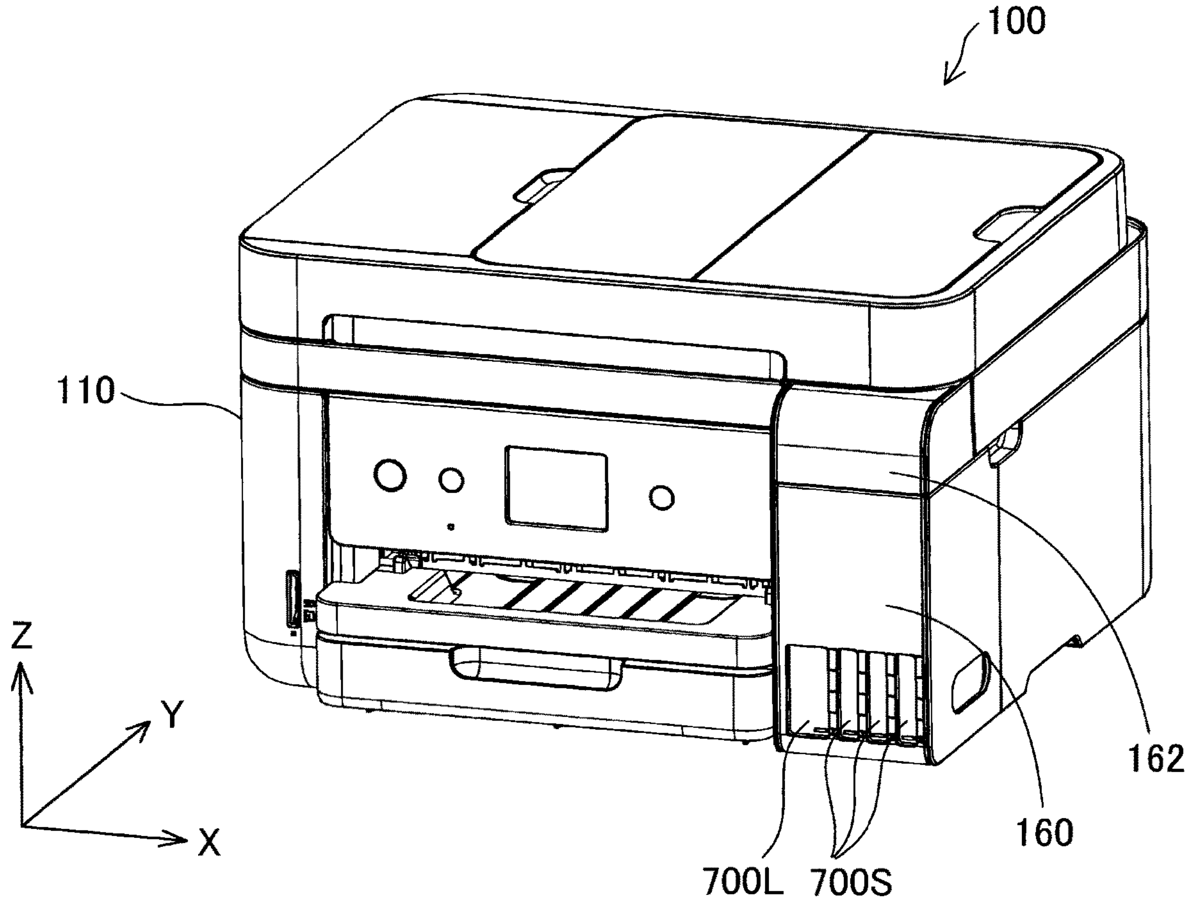
FIG. 1 is a perspective view of a printer in a first embodiment.

FIG. 1 is a perspective view of a printer 100 in a first embodiment. The printer 100 is an ink jet printer that performs printing by ejecting ink onto a print medium. FIG. 1 indicates XYZ-axes orthogonal to one another. The X-axis corresponds to the width direction of the printer 100, the Y-axis to the depth direction of the printer 100, and the Z-axis to the height direction of the printer 100. The printer 100 is placed on a horizontal placement surface defined by the X direction and the Y direction. Note that "the X-axis direction" mentioned here includes the +X direction and the −X direction. Similarly, "the Y-axis direction" mentioned here includes the +Y direction and the −Y direction, and "the Z-axis direction" mentioned here includes the +Z direction and the −Z direction.

The printer 100 includes a housing 110. A carriage (not illustrated) movable in the main scanning direction (the X-axis direction) is provided in the housing 110. The carriage has a print head that ejects ink onto a print medium. An ink-tank housing unit 160 for housing a plurality of ink tanks 700S and 700L is provided at one end of the front face of the housing 110. The ink-tank housing unit 160 has a lid 162 located at its upper portion and configured to open and close. Note that the ink tanks 700S are for small capacity, and the ink tank 700L is for large capacity. However, in the following description, these two types of ink tank are not distinguished and simply referred to as "ink tank 700". Each ink tank 700 is coupled to a print head of the carriage with a tube (not illustrated). In other words, the ink tanks 700 are stationary ink tanks that are not mounted on the carriage of the printer 100. Each ink tank 700 is an ink-refilling ink tank that is refilled with ink from an ink refill container when the amount of remaining ink becomes low. Although the ink tanks 700 are stationary ink tanks in the present embodiment, the ink tanks 700 may be ones configured to be mounted on the carriage of the printer 100.

Figure 2:
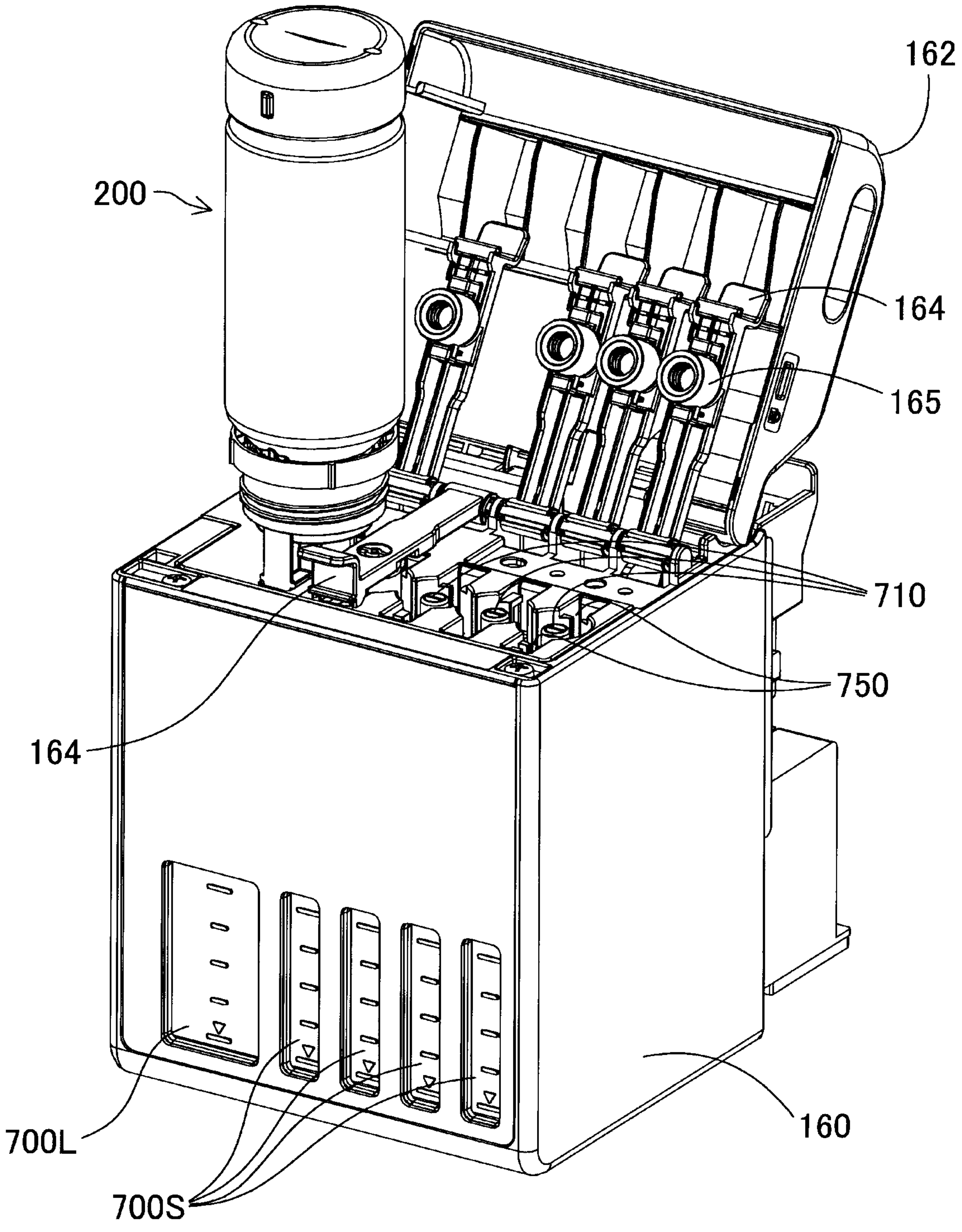
FIG. 2 is a perspective view of an ink tank which is being refilled with ink by using an ink refill container.

FIG. 2 is a perspective view of an ink refill container 200 being used for refilling an ink tank 700 with ink. The front surface of each ink tank 700 is composed of a transparent member, so that the amount of remaining ink in each ink tank 700 can be seen from the outside. When the amount of remaining ink is low, as illustrated in FIG. 2, the lid 162 can be opened, and the ink tank 700 can be refilled with ink through an ink-inlet flow-path member 710 of the ink tank 700.

On the upper face of each ink tank 700, the ink-inlet flow-path member 710 with a tubular shape is provided for refilling the ink tank 700 with ink. The ink-tank housing unit 160 includes sealing cap members 164 each having a sealing cap 165 for sealing the distal end of the ink-inlet flow-path member 710. When the ink tank 700 is not being refilled with ink, the distal end of the ink-inlet flow-path member 710 is sealed by the sealing cap 165 of the sealing cap member 164. To refill the ink tank 700 with ink, the sealing cap member 164 is disengaged from the ink-inlet flow-path member 710, and the front end portion of the ink refill container 200 is inserted into the position of the ink-inlet flow-path member 710 for ink refilling. Two recesses 750 into which fitting portions (described later) of the ink refill container 200 fit are provided near the ink-inlet flow-path member 710. These recesses 750 have a shape 180-degree rotationally symmetric with respect to the ink-inlet flow-path member 710.

In this specification, the term "ink refilling" denotes an action of supplying an ink tank 700 with ink to increase the amount of remaining ink. In this operation, "ink refilling" does not necessarily denote making the ink tank 700 full. In addition, "ink refilling" includes an action of filling an empty ink tank 700 with ink for the initial use of the printer 100.

Figure 3:
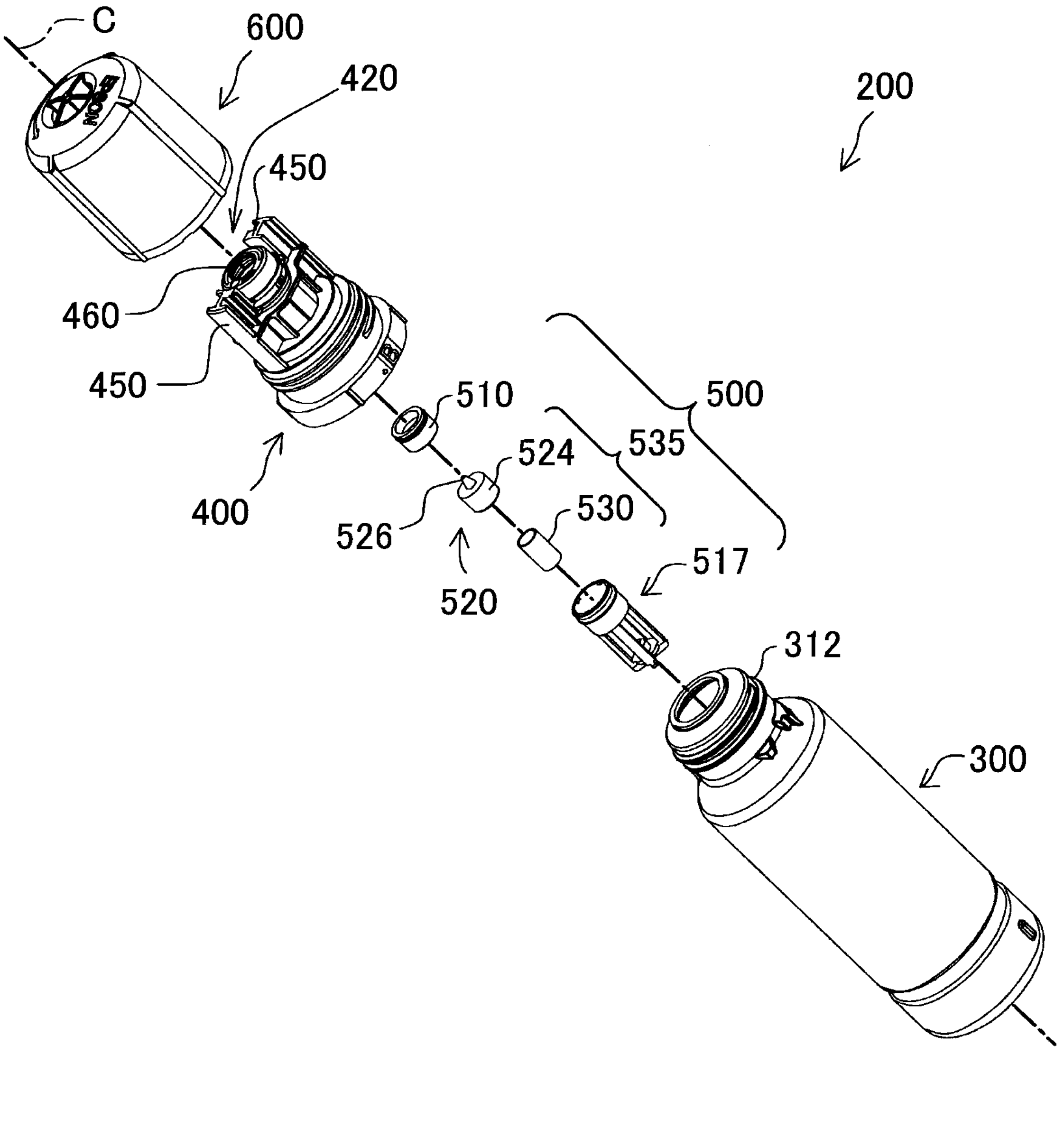
FIG. 3 is an exploded perspective view of the ink refill container in the first embodiment.

FIG. 3 is an exploded perspective view of the ink refill container 200 in the first embodiment. The ink refill container 200 includes a container body 300 configured to store ink, an ink-outlet forming portion 400 in which an ink outlet 460 is formed, an outlet valve unit 500, and a cap 600 configured to be attached to the ink-outlet forming portion 400. The upper-end side of the ink refill container 200 which is the cap 600 side is referred to as "front-end side", and the lower-end side which is the container body 300 side is referred to as "back-end side". The container body 300 is a hollow cylindrical container having an opening on the front-end side. A small-diameter portion at the front end of the container body 300 has an outer thread 312 for attaching the ink-outlet forming portion 400. In the present disclosure, the direction parallel to the center axis C of the ink refill container 200 is referred to as "axial direction", and any direction outward from the center axis C is referred to as "radial direction".

The distal end of the ink-outlet forming portion 400 has the ink outlet 460. The ink-outlet forming portion 400 includes a tubular portion 420 configured to be connected to the container body 300 and having the ink outlet 460. The outlet valve unit 500 is placed in the tubular portion 420. Hence, the outlet valve unit 500 can be considered to be a member included in the ink-outlet forming portion 400. A valve housing 517 is placed in the tubular portion 420 with a gap between the valve housing 517 and the tubular portion 420 in the radial directions. When the ink tank 700 is being refilled with ink, the ink-inlet flow-path member 710 (FIG. 2) of the ink tank 700 is inserted into the ink outlet 460.

The outlet valve unit 500 is configured such that the ink outlet 460 is sealed to prevent ink from leaking outside in the non-refilling state in which the ink tank 700 is not being refilled with ink, and the seal is released to allow ink to flow into the ink-inlet flow-path member 710 in the refilling state in which the ink tank 700 is being refilled with ink. The outlet valve unit 500 corresponds to a valve in the present disclosure.

Figure 4:
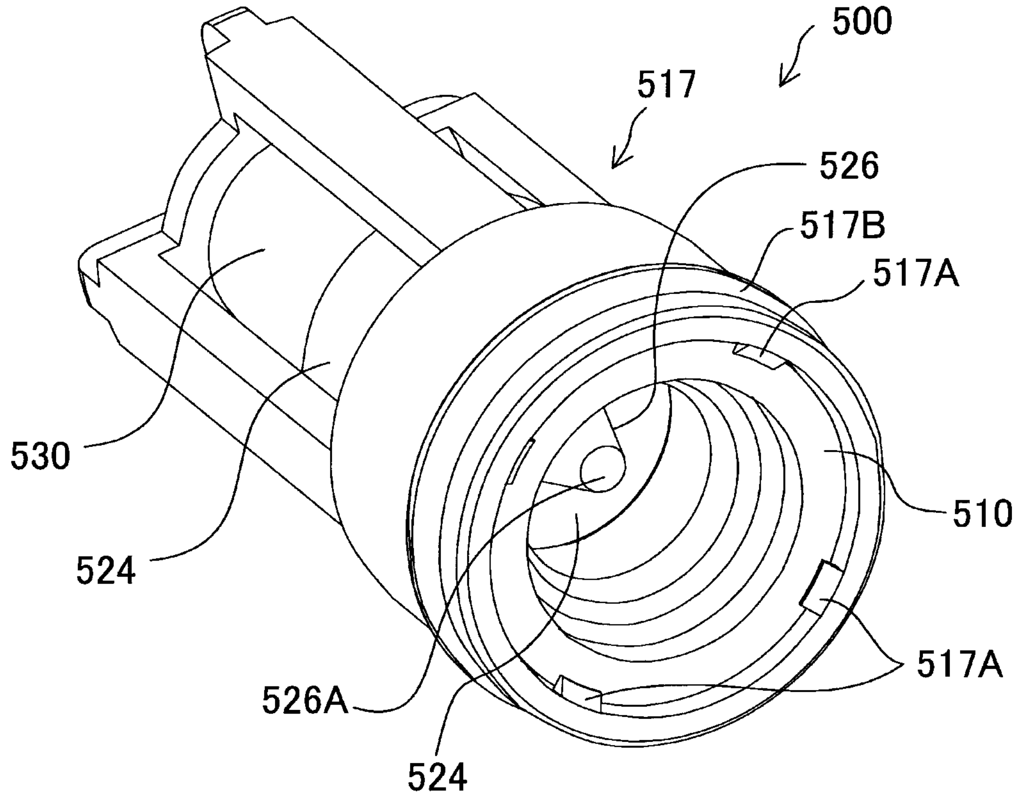
FIG. 4 is a perspective view of an outlet valve unit.
Figure 5:
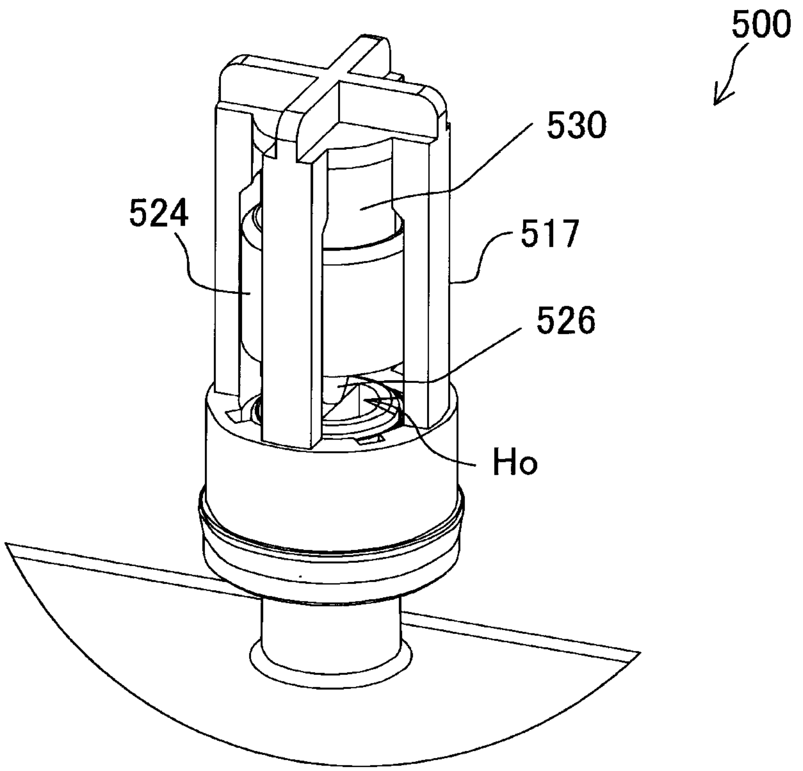
FIG. 5 is a perspective view of the outlet valve unit into which an ink-inlet flow-path member is inserted.

As illustrated in FIG. 3, the outlet valve unit 500 includes the valve housing 517, a sealing member 510, and a spring valve 535. FIG. 4 is a perspective view of the outlet valve unit 500. FIG. 5 is a perspective view of the outlet valve unit 500 into which the ink-inlet flow-path member 710 is inserted.

The valve housing 517 is configured such that the ink-inlet flow-path member 710 can be inserted into and removed from the valve housing 517. As illustrated in FIG. 4, the valve housing 517 includes, on its front-end side, retaining portions 517A to prevent the sealing member 510 from coming off and an engagement portion 517B configured to be engaged with the tubular portion 420. Hence, since the outlet valve unit 500 alone is attachable and detachable, the manufacturing is easy, and the outlet valve units 500 alone can be transported. In addition, when the ink refill container 200 is reused, the outlet valve unit 500 can be replaced with another one. As illustrated in FIG. 5, the valve housing 517 has through holes Ho extending through in directions intersecting the axial direction. The through holes Ho each extend through the side wall of the valve housing 517 in a radial direction with respect to the center axis C and also extend in the axial direction. The through holes Ho communicate with a gap between the valve housing 517 and the tubular portion 420 in the radial directions.

The spring valve 535 includes a valve member 520 and a spring member 530. As illustrated in FIGS. 3 to 5, the spring member 530 is housed in the valve housing 517. The spring member 530 is housed in a portion of the valve housing 517 on the back-end side in the axial direction. The spring member 530 may be made of, for example, a metal. In the present embodiment, the spring member 530 is a coil spring. The spring member 530 urges the valve member 520 in the axial direction toward the ink outlet 460.

The valve member 520 is placed in the valve housing 517 so as to be movable in the axial direction. The valve member 520 includes a cylindrical portion 524 and a protrusion 526. In the valve member 520, the protrusion 526 is located on an end surface of the cylindrical portion 524 which is a substantially cylindrical member. The cylindrical portion 524 faces the inner side surface of the valve housing 517. The cylindrical portion 524 is configured to slide by being guided by the inner side surface of the valve housing 517. This configuration makes the opening/closing operation of the valve member 520 favorable. A valve open state and a valve closed state of the valve member 520 will be described later. The valve member 520 may be made of, for example, a thermoplastic resin such as polyethylene and polypropylene. As illustrated in FIG. 4, the protrusion 526 of the valve member 520 includes a separator contact portion 526A having a circular end surface and configured to come into contact with a separator wall 714 described later of the ink-inlet flow-path member 710. The protrusion 526 is formed such that the cross-sectional area in the directions orthogonal to the axial direction is larger on the back-end side than on the front-end side having the separator contact portion 526A in the axial direction. Although the separator contact portion 526A in this case has a circular end surface, the shape is not limited to a circular end surface. The separator contact portion 526A may have an end surface with any other shape such as an elliptical end surface as long as it provides the operational advantage of the present disclosure.

The valve member 520 can be put into the valve closed state or the valve open state. Specifically, the valve member 520 is urged by the spring member 530 toward the sealing member 510. When the cylindrical portion 524 is in contact with the sealing member 510 by the urging, the valve member 520 is in the valve closed state. In this valve closed state, the contact between the cylindrical portion 524 and the sealing member 510 closes the opening in the axial direction. The valve member 520 is configured to be pressed by the ink-inlet flow-path member 710 in the direction opposite to the urging direction of the spring member 530. When the cylindrical portion 524 is moved away from the sealing member 510 by the pressing, the valve member 520 is put into the valve open state. In this valve open state, the cylindrical portion 524 moving away from the sealing member 510 makes an opening in the axial direction.

Figure 6:
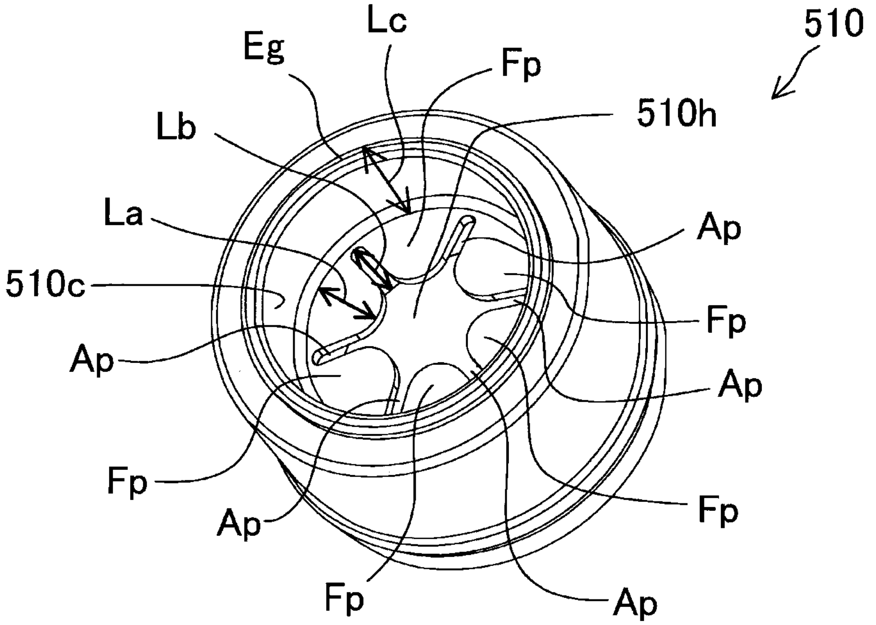
FIG. 6 is a perspective view of a sealing member.

FIG. 6 is a perspective view of the sealing member 510. The sealing member 510 has a substantially ring shape. The sealing member 510 may be made of, for example, a rubber member (elastomer) having rubber elasticity. The sealing member 510 has an opening that the ink-inlet flow-path member 710 can be inserted into and removed from. The sealing member 510 is placed in the tubular portion 420. As illustrated in FIG. 3, the sealing member 510 is located closer to the front end than the spring member 530 in the axial direction.

As illustrated in FIG. 6, the sealing member 510 includes a sealing end Eg that is in contact with the valve member 520 in the valve closed state. The sealing member 510 includes a sealing-member cylindrical portion 510C and an elastic membrane portion. The sealing-member cylindrical portion 510C of the sealing member 510 extends in the axial direction along the center axis C of the ink outlet 460 and has a cylindrical shape. The sealing-member cylindrical portion 510C corresponds to a cylindrical portion in the present disclosure.

The elastic membrane portion includes a sealing-member through hole 510*h* and six blade portions Fp. The sealing-member through hole 510*h* is formed at the center of the elastic membrane portion corresponding to the center axis C of the ink outlet 460. The six blade portions Fp are separated by six slit-shaped gaps Ap extending from the sealing-member through hole 510*h* toward the inner circumferential wall of the sealing-member cylindrical portion 510C in radial directions. The gaps Ap corresponds to slits in the present disclosure. When the ink refill container 200 is removed from the ink-inlet flow-path member 710, the blade portions Fp seeking to return to their original states from elastic deformation block the ink being lifted up from the ink-inlet flow-path member 710, thereby reducing ink dripping. The capillary action of the slit-shaped gaps Ap makes it easier to hold ink, and this can make ink dripping less likely.

The radial length La from the root to the distal end on the center side of the blade portion Fp is shorter than the length Lc from the roots of the blade portions Fp to the sealing end Eg of the sealing member 510 in the direction along the center axis. Hence, in the valve open state in which the valve member 520 is pressed by the ink-inlet flow-path member 710 and is open, it is likely that the situation in which the distal ends of the blade portions Fp elastically deformed impede the flow of ink and air between the flow path of the ink-inlet flow-path member 710 and the container body 300 can be avoided.

The radial length Lb of the gap Ap is shorter than the radius from the center axis to the outer circumference of the ink-inlet flow-path member 710. Specifically, since the length Lb is shorter, when the ink-inlet flow-path member 710 is inserted, the ink-inlet flow-path member 710 is squeezed tight. This configuration improves the sealing performance between the ink-inlet flow-path member 710 and the roots of the blade portions Fp and makes ink leaking less likely.

The parts of the ink refill container 200 excluding the outlet valve unit 500 may be made of, for example, a thermoplastic resin such as polyethylene or polypropylene.

As illustrated in FIG. 3, two fitting portions 450 are provided near the ink outlet 460. These fitting portions 450 are positioning members that fit into the recesses 750 (FIG. 2) near the ink-inlet flow-path member 710 of the ink tank 700 to position the ink refill container 200. The term "positioning" denotes, for example, at least one of the function to prevent pouring of incorrect ink and the function to stabilize the orientation of the ink refill container when ink is poured. The function to prevent pouring of incorrect ink works such that an ink refill container 200 for supplying yellow ink fits into the recesses 750 associated with an ink tank 700 for storing yellow ink, and an ink refill container 200 for supplying another color of ink such as magenta ink or cyan ink does not. The function to stabilize the orientation of the ink refill container when ink is poured will be described later. The function to prevent pouring of incorrect ink not only works in terms of the color of ink but also, for example, prevents incorrect pouring between dye ink and pigment ink of black ink. In the present embodiment, the two fitting portions 450 are 180-degree rotationally symmetric with respect to the center axis C of the ink refill container 200. The recesses 750 near the ink-inlet flow-path member 710 of the ink tank 700 are also 180-degree rotationally symmetric with respect to the ink-inlet flow-path member 710. Since the fitting portions 450 of the ink refill container 200 are fitted into the recesses 750 near the ink-inlet flow-path member 710 of the ink tank 700 when ink is supplied, the orientation of the ink refill container 200 is limited to two orientations that are 180-degree rotationally symmetric. This configuration makes it possible to keep the ink refill container 200 in a stable orientation when ink is supplied. However, a configuration without the fitting portions 450 is possible.

Figure 7:
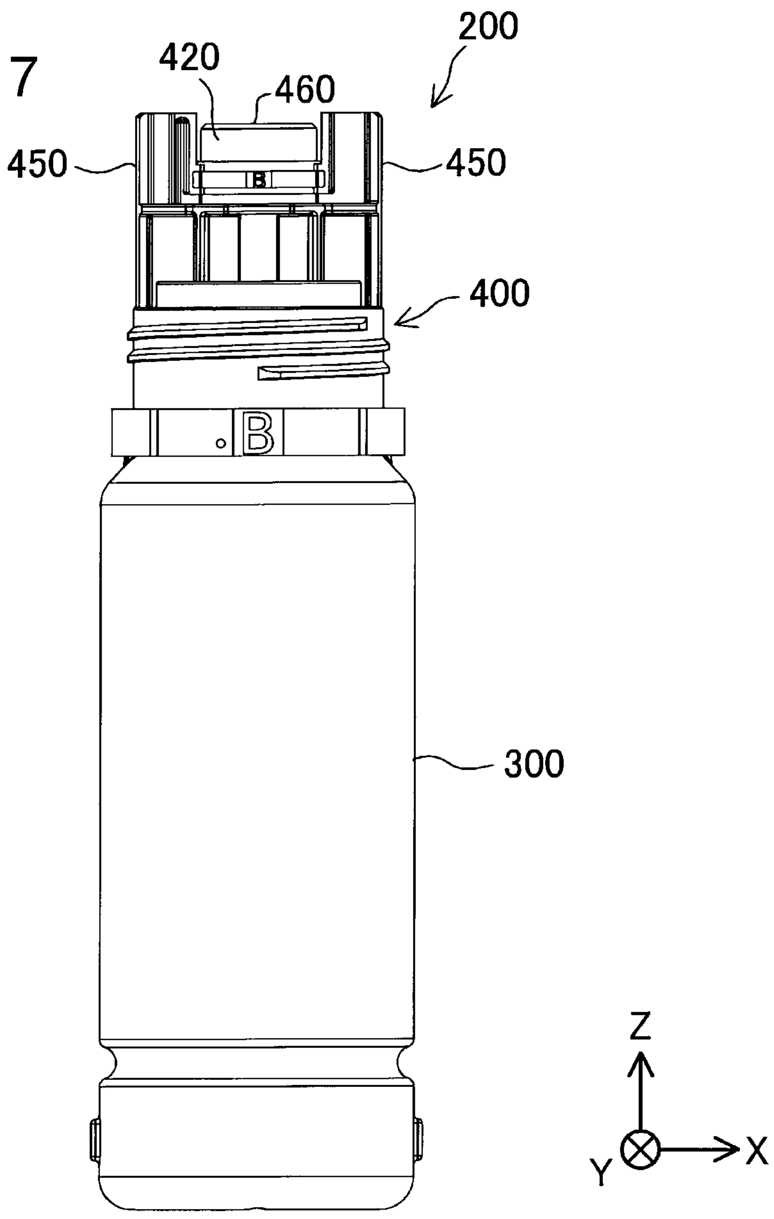
FIG. 7 is a front view of the ink refill container in the upright position.
Figure 8:
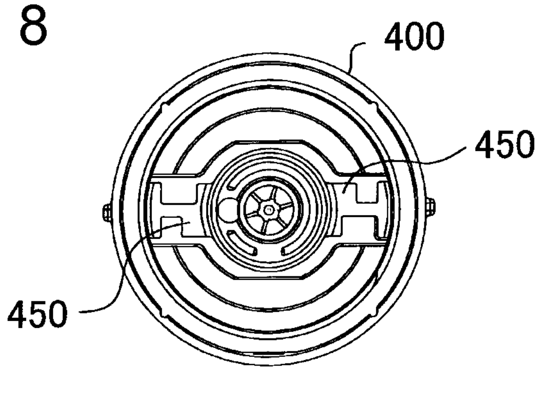
FIG. 8 is a plan view of FIG. 7.

FIG. 7 is a front view of the ink refill container 200 in the upright position, and FIG. 8 is a plan view of FIG. 7. The expression "the ink refill container 200 in the upright position" denotes the state in which the ink refill container 200 is placed on a horizontal surface such as a desk with the bottom of the container body 300 downward. As illustrated earlier in FIG. 2, when the ink tank 700 is refilled with ink, the ink refill container 200 is in an inverted position with the front-end side of the ink refill container 200 downward. Note that FIGS. 7 and 8 illustrate a state without the cap 600.

Figure 9:
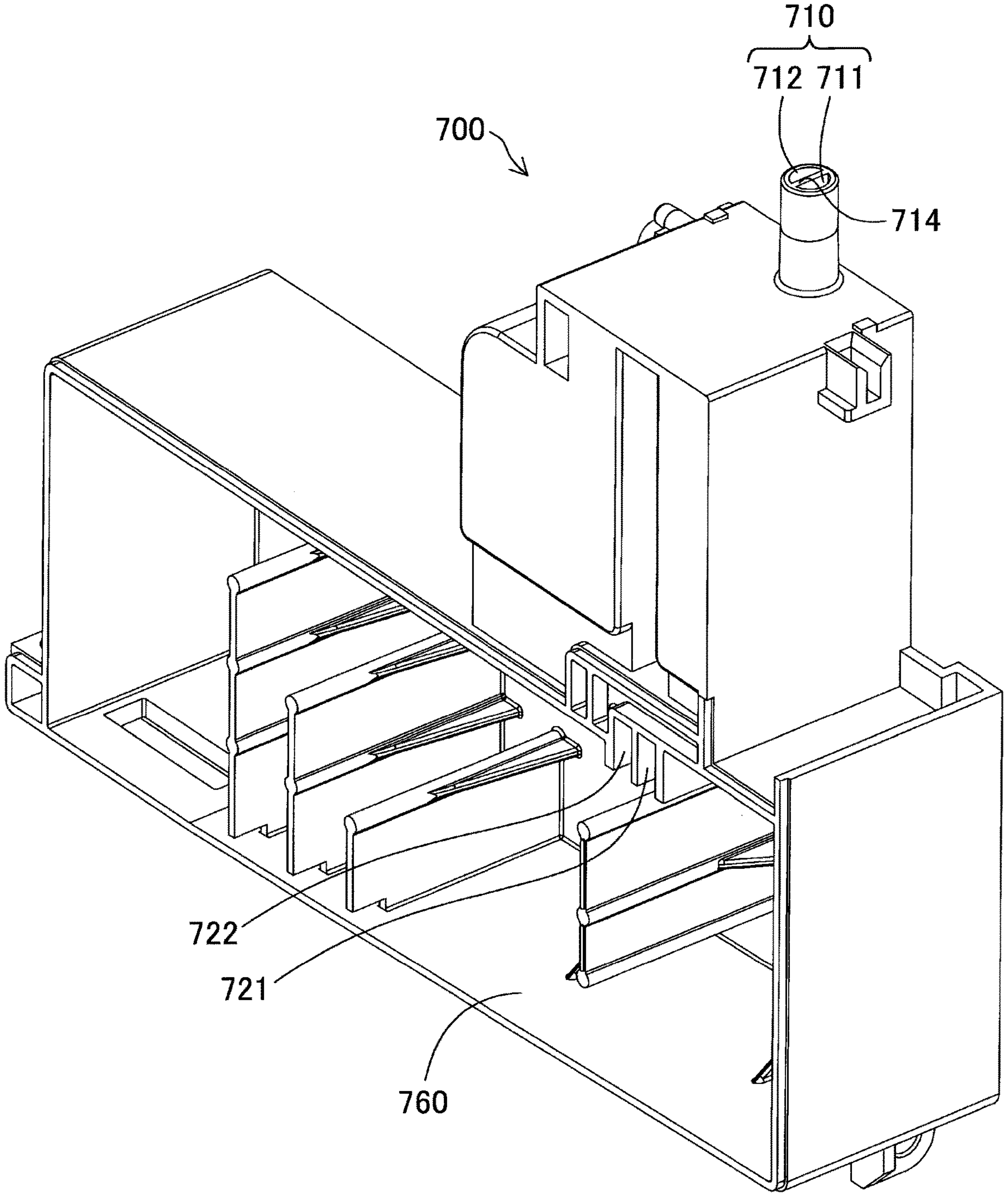
FIG. 9 is a perspective view of the ink tank of the first embodiment.

FIG. 9 is a perspective view of the ink tank 700 of the first embodiment. The ink-inlet flow-path member 710 of the ink tank 700 protrudes upward from the ink tank 700. The ink-inlet flow-path member 710 includes two flow paths 711 and 712. The two flow paths 711 and 712 are separated from each other by the separator wall 714. In the first embodiment, the distal end surface of the ink-inlet flow-path member 710 is flat, and the two flow paths 711 and 712 are open in the distal end surface of the ink-inlet flow-path member 710. Part of the distal end surface of the ink-inlet flow-path member 710 is the end portion of the separator wall 714. To supply ink, the fitting portions 450 of the ink refill container 200 are fitted into the recesses 750 near the ink-inlet flow-path member 710 of the ink tank 700, and thereby the ink refill container 200 is positioned in the circumferential direction. With this, the two flow paths 711 and 712 respectively communicate with two in-tank flow paths 721 and 722 protruding into an ink storage chamber 760 located below. The lower ends of these in-tank flow paths 721 and 722 are located at positions lower than the ceiling wall of the ink storage chamber 760. This is because when the ink tank 700 is being refilled with ink from the ink refill container 200, the air-liquid exchange stops when the liquid level in the ink storage chamber 760 reaches the lower ends of the in-tank flow paths 721 and 722, and along with this, ink supply also stops, which makes ink refilling work easy.

Figure 10:
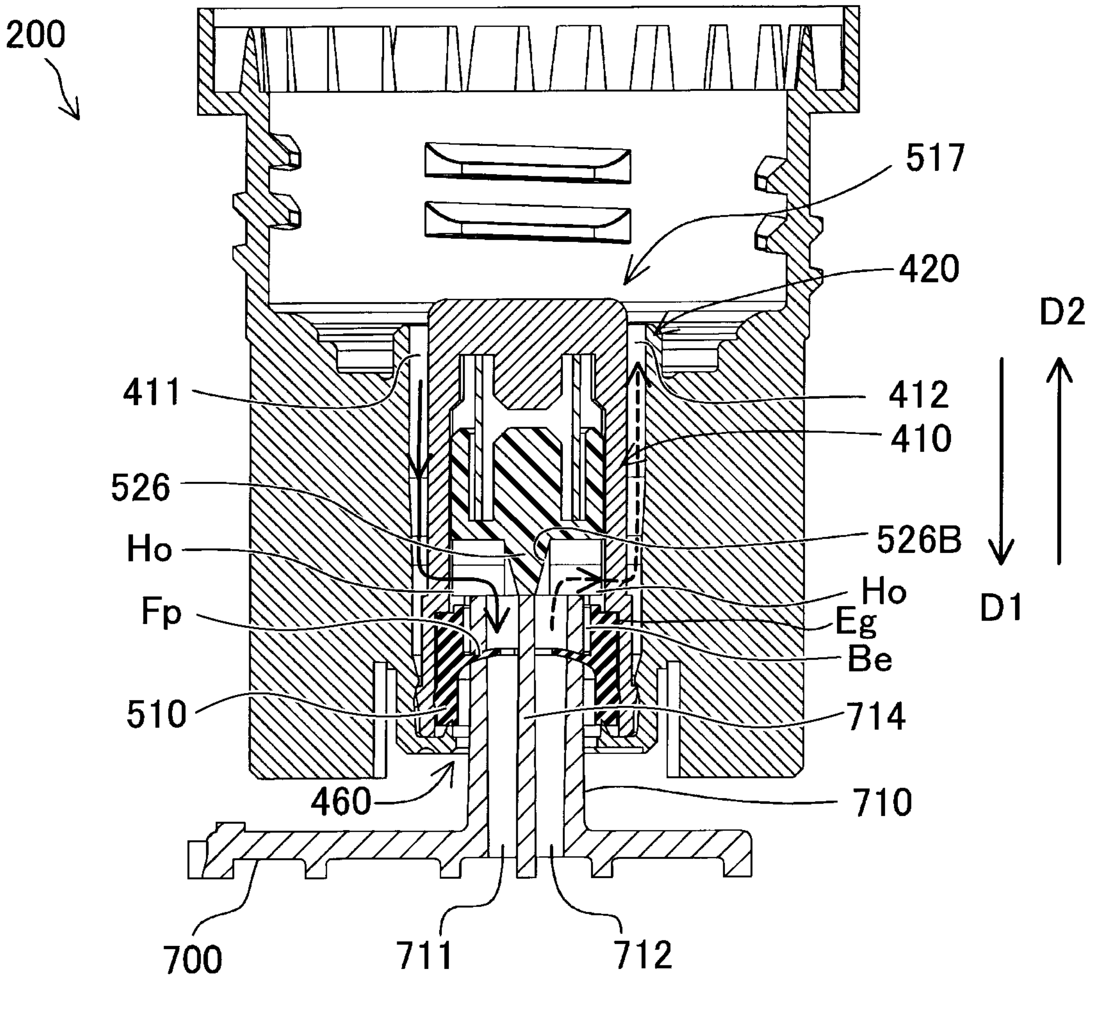
FIG. 10 is a cross-sectional view of a portion showing a refilling state in which the ink tank is being refilled with ink from the ink refill container.

FIG. 10 is a cross-sectional view of a portion showing the refilling state in which the ink tank 700 is being refilled with ink from the ink refill container 200. In this refilling state, the ink refill container 200 is in the inverted position, and the direction from the back end toward the front end of the ink refill container 200 is indicated as the front end direction D1, which is the direction in which the ink refill container 200 is coupled to the ink-inlet flow-path member 710. The direction from the front end toward the back end of the ink refill container 200 is indicated as the back end direction D2, which is the direction in which the ink refill container 200 is removed from the ink-inlet flow-path member 710. Note that FIG. 10 illustrates only parts of the ink refill container 200 and the ink tank 700.

In the refilling state as illustrated in FIG. 10, the tubular portion 420 has such a shape that a gap Be for the blade portions Fp to enter is formed between the inner side surface of the tubular portion 420 and the outer side surface of the ink-inlet flow-path member 710. This configuration reduces frictional resistance that occurs when the ink-inlet flow-path member 710 is inserted and removed, making it easy to couple and decouple the ink refill container 200 to and from the ink-inlet flow-path member 710. Note that although insertion of the ink-inlet flow-path member 710 presses and opens the blade portions Fp, and the blade portions Fp enter the gap Be, FIG. 10 illustrates the blade portions Fp before entering the gap Be, for convenience of illustration.

Figure 19:
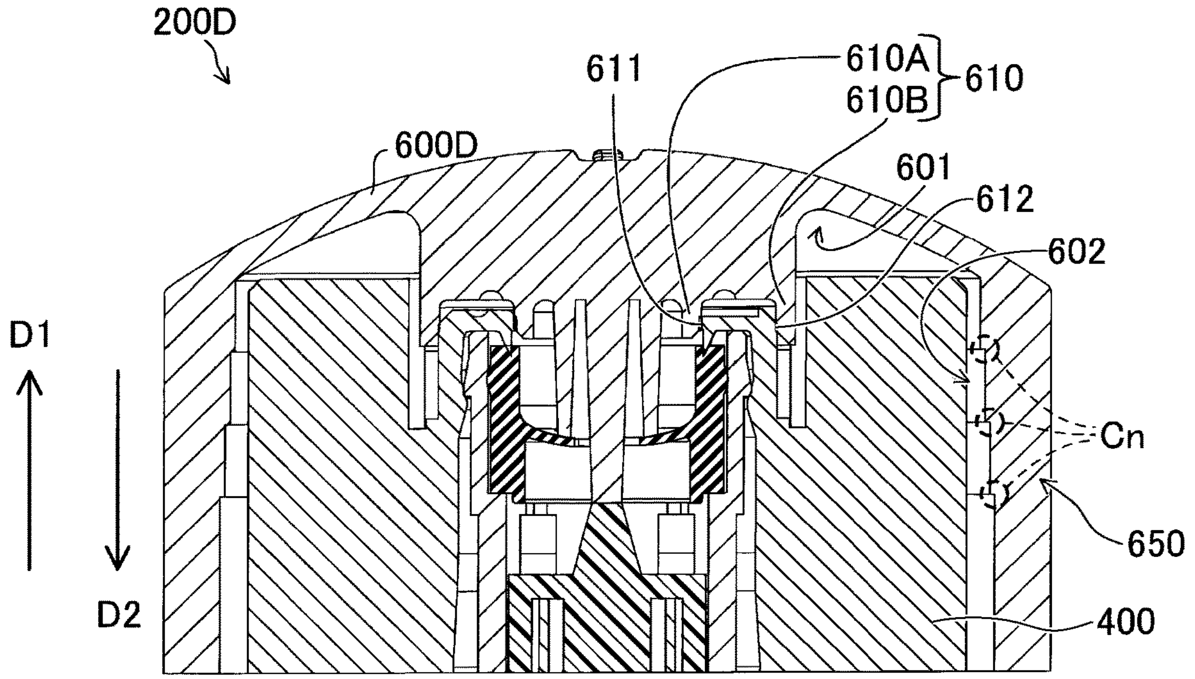
FIG. 19 is a cross-sectional partial view of an ink refill container which is closed with a cap of a fifth embodiment.
Figure 20:
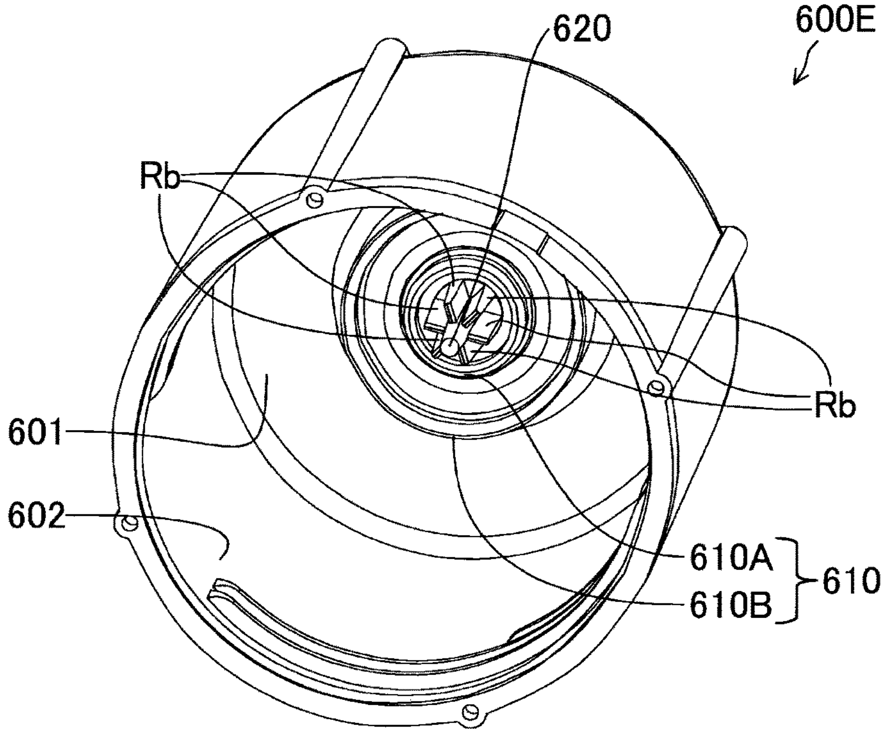
FIG. 20 is a perspective view of a cap of another embodiment.

The ink-inlet flow-path member 710 of the ink tank 700 is inserted into a tubular flow-path portion 410 through the opening of the sealing member 510. The tubular flow-path portion 410 is a flow-path space in the tubular portion 420. The flow path (which is also referred to as "supply flow path") from the radial center of the tubular flow-path portion 410 to the inner circumferential surface of the tubular portion 420 is separated into two supply flow paths 411 and 412 formed in a gap between the valve housing 517 and the inner circumferential surface of the tubular portion 420 by the protrusion 526 of the valve member 520 coming into contact with the separator wall 714 of the ink-inlet flow-path member 710. The gap forming the supply flow paths 411 and 412 may include a gap present between the inner circumferential surface of the tubular portion 420 and the valve member 520 and spring member 530 housed in the valve housing 517 with the through holes Ho interposed therebetween. Hence, the gap may be said to be a gap present between the outlet valve unit 500 and the inner circumferential surface of the tubular portion 420 with the through holes Ho interposed therebetween. As described later, when ink is being supplied, one of the two supply flow paths 411 and 412 is used as a flow path for ink, and the other is used as a flow path for air. Thus, this configuration enables the ink refill container 200 to supply ink by performing air-liquid exchange with the ink tank 700. When supplying ink by using air-liquid exchange, the container body 300 need not be squeezed. A type of an ink refill container that enables ink to be supplied without squeezing the container body 300 as described above is also referred to as "non-squeeze type". Note that the flow path of the tubular flow-path portion 410 need not be separated into the two supply flow paths 411 and 412 communicating through the flow paths 711 and 712 of the ink-inlet flow-path member 710 and the through holes Ho of the valve housing 517, and the flow path of the tubular flow-path portion 410 may be one supply flow path. In such a case, the ink-inlet flow-path member 710 may be as illustrated in FIGS. 19 and 20, described later. In a possible configuration, the protrusion 526 of the valve member 520 may come into contact with a separator wall 714 that separates the ink-inlet flow-path member 710 into three or more flow paths, thereby separating the tubular flow-path portion 410 into three or more supply flow paths.

In the outlet valve unit 500, the supply flow paths 411 and 412 present from the radial center of the tubular flow-path portion 410 to the inner circumferential surface of the tubular portion 420 communicate with the two flow paths 711 and 712 of the ink-inlet flow-path member 710 in the refilling state. Note that in order that the communication between the supply flow paths 411 and 412 and the two flow paths 711 and 712 of the ink-inlet flow-path member 710 can enable air and liquid to go in and out, to be in the valve open state in which air and liquid can pass through the through holes Ho is necessary.

The protrusion 526 of the valve member 520 is located at a position facing the separator wall 714 of the ink-inlet flow-path member 710. In the refilling state, the protrusion 526 of the valve member 520 is pushed by the ink-inlet flow-path member 710 and retreats toward the container body 300, so that the two flow paths 711 and 712 of the ink-inlet flow-path member 710 communicate through the through holes Ho with the supply flow paths 411 and 412 present from the radial center of the tubular flow-path portion 410 to the inner circumferential surface of the tubular portion 420. This state occurs in the valve open state described above. In this state, the ink in the container body 300 is allowed to flow into the ink-inlet flow-path member 710 through the supply flow paths 411 and 412. In FIG. 10, the arrows of solid lines indicate the flow of ink, and the arrows of dashed lines indicate the flow of air. As described above, in the refilling state, the two flow paths 711 and 712 of the ink-inlet flow-path member 710 and the two supply flow paths 411 and 412 of the tubular flow-path portion 410 are used to efficiently refill the ink tank 700 with ink from the ink refill container 200 while performing air-liquid exchange. To smoothly perform this air-liquid exchange, it is preferable that the supply flow path of the tubular flow-path portion 410 be separated into a plurality of supply flow paths. The same is true of the ink-inlet flow paths of the ink-inlet flow-path member 710. In this case, it is preferable that in the refilling state, one or more supply flow paths out of a plurality of supply flow paths communicate with one or more ink-inlet flow paths out of a plurality of ink-inlet flow paths, and that another or other supply flow paths out of the plurality of supply flow paths communicate with another or other ink-inlet flow paths out of the plurality of ink-inlet flow paths.

As described above, the protrusion 526 is formed such that the cross-sectional area in the directions orthogonal to the axial direction is larger on the back-end side than on the front-end side having the separator contact portion 526A in the axial direction. Since the cross-sectional area on the side that comes into contact with the separator wall 714 is smaller than the cross-sectional area on the back-end side, this configuration is less likely to impede the inflow of ink to and the outflow of air from the plurality of flow paths and enables smooth air-liquid exchange. The larger back-end side ensures a necessary strength at the time when the protrusion 526 of the valve member 520 comes into contact with the separator wall 714, thereby keeping the separation function favorable.

As illustrated in FIGS. 4 and 10, the protrusion 526 of the valve member 520 includes an inclined surface 526B which expands from the front-end side toward the back-end side. This enables air and liquid to flow along the inclined surface 526B, reducing portions where air and liquid interfere with each other. This enables liquid refilling in a rapid manner by smooth air-liquid exchange.

As illustrated in FIG. 10, at least a center portion of the back-end side of the valve housing 517 is closed. This configuration prevents interference between air and liquid and makes the air-liquid exchange smooth, thereby enabling ink refilling in a rapid manner.

Figure 11:
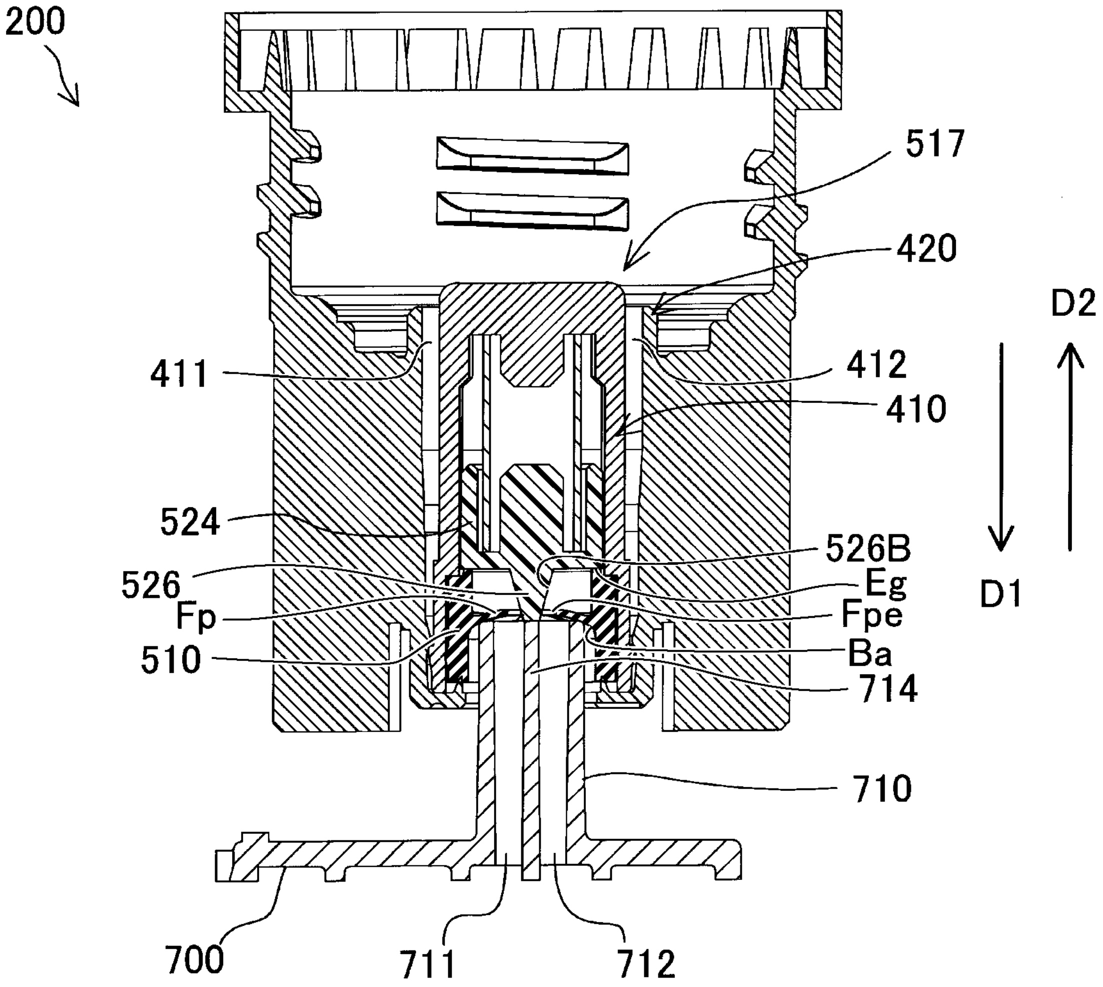
FIG. 11 is a first cross-sectional partial view of the ink refill container being removed from the ink-inlet flow-path member.
Figure 12:
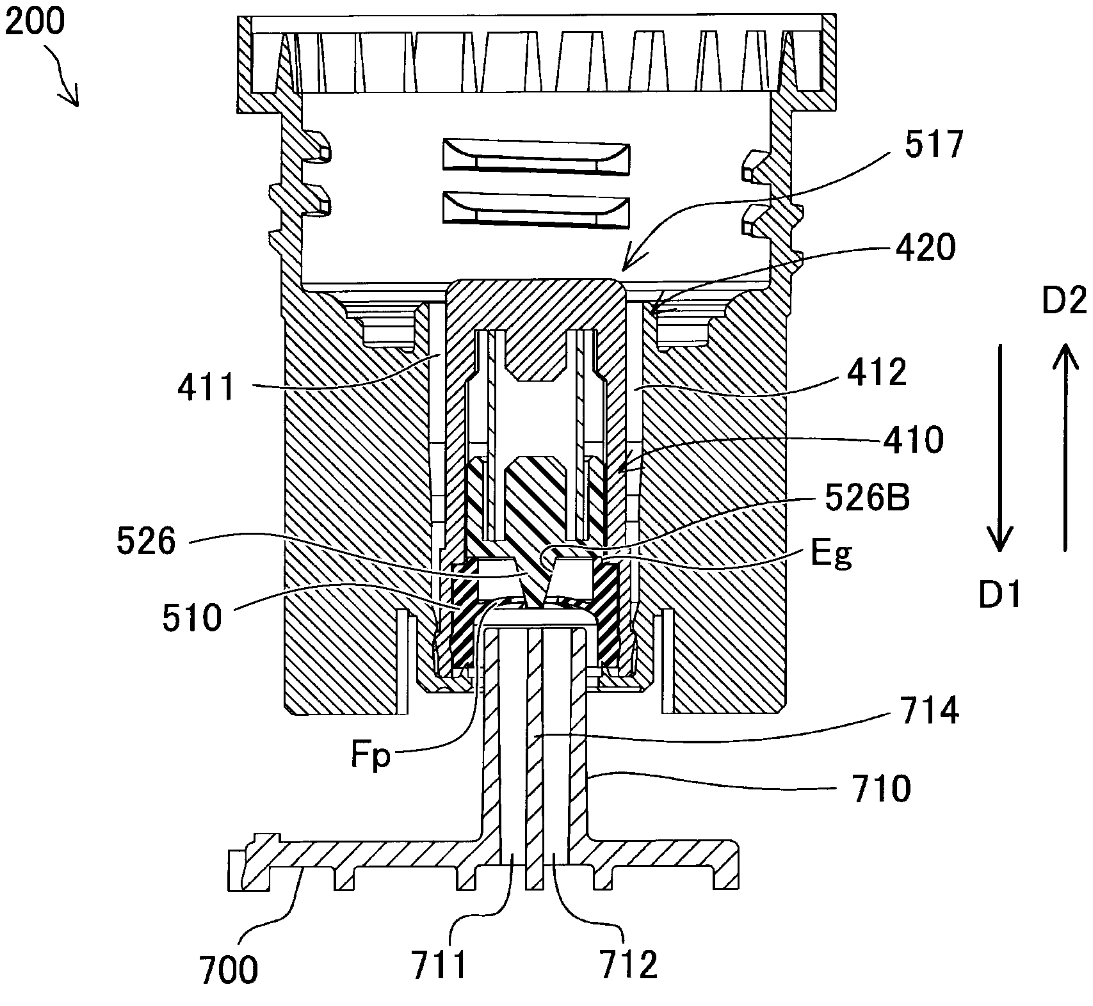
FIG. 12 is a second cross-sectional partial view of the ink refill container being removed from the ink-inlet flow-path member.

FIG. 11 is a first cross-sectional partial view of the ink refill container 200 being removed from the ink-inlet flow-path member 710. FIG. 12 is a second cross-sectional partial view of the ink refill container 200 being removed from the ink-inlet flow-path member 710. As illustrated in FIG. 11, each blade portion Fp has such a shape that the distal end Fpe on the center side is located in the back end direction D2 relative to the root Ba in the axial direction, and the cross section is arch-shaped. In this configuration, even when the ink-inlet flow-path member 710 is inserted toward the back-end side and presses the blade portions Fp, plastic deformation of the blade portions Fp is less likely to occur than in an elastic membrane portion having such a shape that the membrane portion does not incline relative to the directions perpendicular to the axial direction. Accordingly, the recovering force is less likely to decrease, making it possible to keep the ink retention force favorable.

As illustrated in FIG. 11, the sealing end Eg is axially in contact with the cylindrical portion 524. FIG. 12 illustrates the ink refill container 200 further pulled out toward the back-end side from the state in FIG. 11, and the valve member 520 and the blade portions Fp are axially away from the ink-inlet flow-path member 710. In ink refilling as illustrated in FIG. 10, ink adheres to the outer circumferential side surface of the ink-inlet flow-path member 710. When the state is shifted to the one as illustrated in FIG. 11 in which the ink-inlet flow-path member 710 is being removed, linkage of ink between the ink outlet 460 and the top portion of the ink-inlet flow-path member 710 is cut off by the blade portions Fp in the course of recovering from elastic deformation. The ink in this state flows on the blade portions Fp radially outward from the center side and is received and held at the roots of the blade portions Fp. Thus, when the ink refill container 200 is further pulled out in the back end direction D2 from the state in FIG. 12, and the ink refill container 200 is completely separate from the ink tank 700, the ink in the above state is less likely to leak outside the ink refill container 200 and the ink tank 700.

Figure 13:
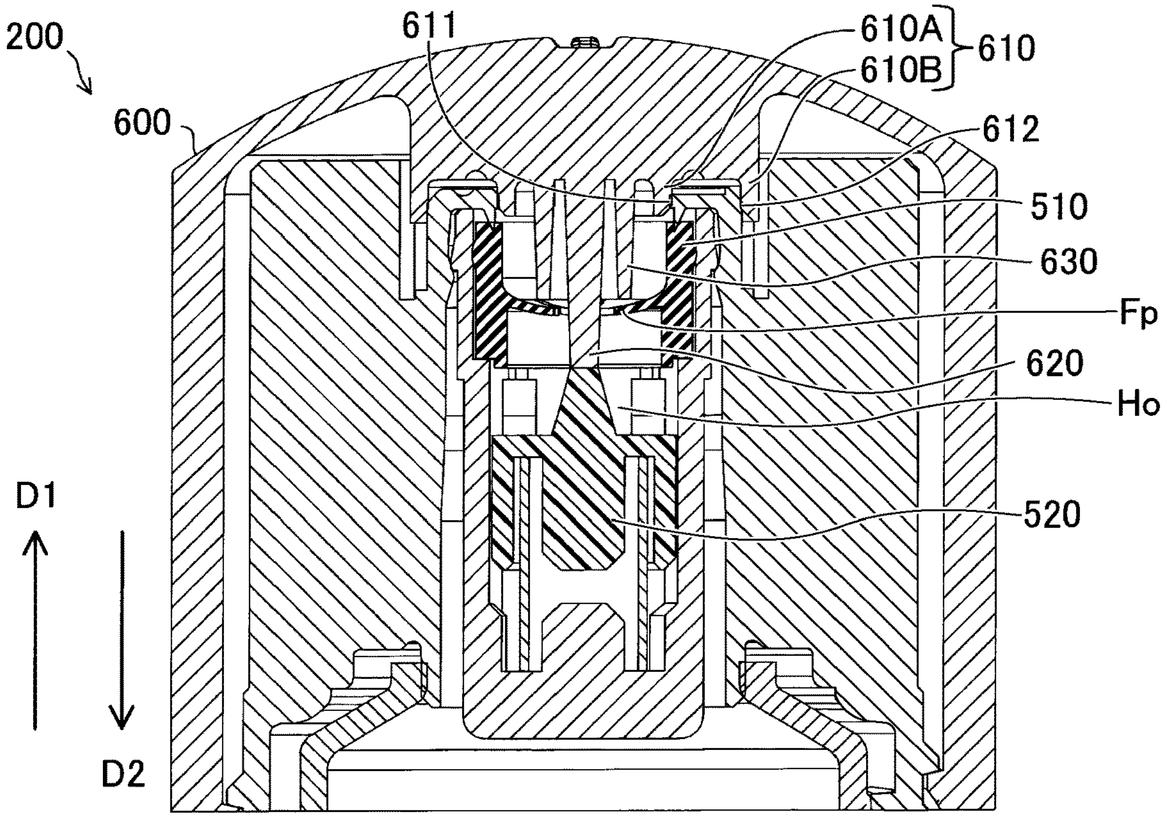
FIG. 13 is a cross-sectional partial view of the ink refill container which is closed with a cap.
Figure 14:
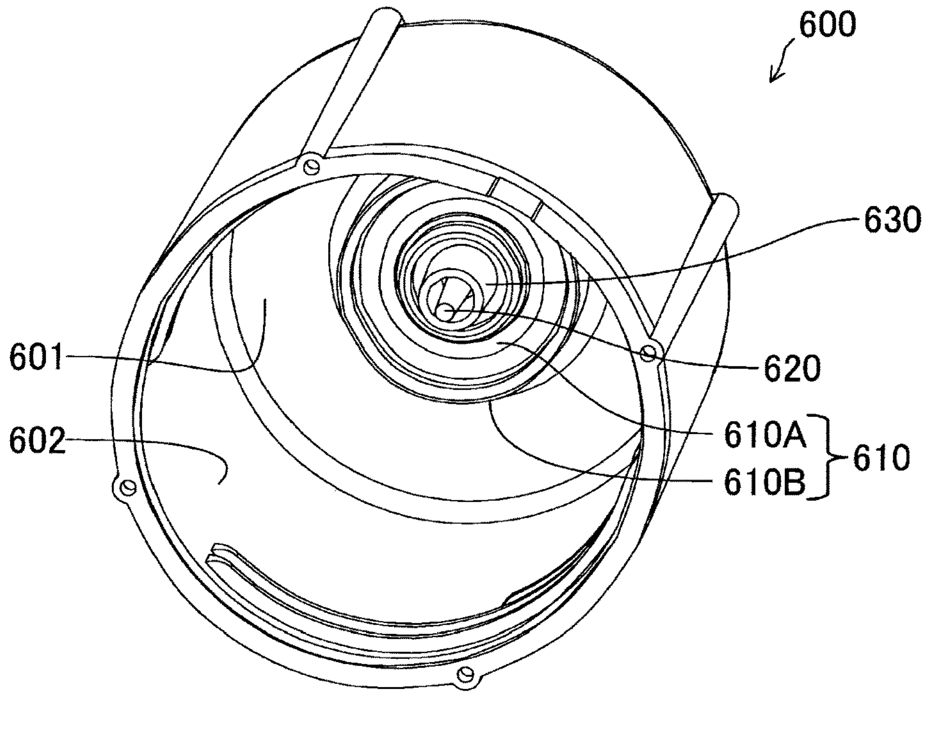
FIG. 14 is a perspective view of the cap of the first embodiment.

FIG. 13 is a cross-sectional partial view of the ink refill container 200 which is closed with the cap 600 in the first embodiment. FIG. 14 is a perspective view of the cap 600 of the first embodiment. As illustrated in FIG. 13, the cap 600 is detachably attached to the ink-outlet forming portion 400. In the following description, the state in which the cap 600 is attached to the ink outlet 460 is referred to as "attached state". As illustrated in FIG. 14, the cap 600 includes an inner top-surface portion 601 and an inner side-surface portion 602. The inner top-surface portion 601 is a surface, out of the inner surfaces of the cap 600, that faces the ink outlet 460 in the cap 600 attached state. The inner side-surface portion 602 is a tubular surface, out of the inner surfaces of the cap 600, that extends in the direction intersecting the inner top-surface portion 601 and faces the side surface of the ink-outlet forming portion 400 in the cap 600 attached state. The cap 600 of the present embodiment includes an annular protrusion 610, a center protrusion 620, and a peripheral wall portion 630 in the inner top-surface portion 601. The annular protrusion 610 is located outside the center protrusion 620 in the radial directions with respect to the center protrusion 620. The annular protrusion 610 protrudes axially from the inner top-surface portion 601 toward the ink-outlet forming portion 400.

The annular protrusion 610 includes an inner annular protrusion 610A having an inner sealing portion 611 and an outer annular protrusion 610B having an outer sealing portion 612. As illustrated in FIG. 13, the inner sealing portion 611 in the cap 600 attached state is in contact with the inner circumferential surface of the tubular portion 420 having the ink outlet 460 to reduce ink leakage. The outer sealing portion 612 in the cap 600 attached state is in contact with the outer circumferential surface of the tubular portion 420 having the ink outlet 460 to reduce ink leakage. Each of the inner sealing portion 611 and the outer sealing portion 612 corresponds to a cap-side sealing portion in the present disclosure. Note that a configuration in which the annular protrusion 610 does not include the outer sealing portion 612 and includes only the inner sealing portion 611 is possible. Specifically, the annular protrusion 610 may include only the inner annular protrusion 610A.

In the course of opening or closing the cap 600, each of the inner sealing portion 611 and the outer sealing portion 612 is away from the ink outlet 460, and gaps are present. Through these gaps and the through holes Ho, the inside of the container body 300 communicates with the outside. Hence, the inside of the ink refill container 200 is exposed to the atmosphere. Thus, when the internal pressure of the ink refill container 200 is increased due to changes in temperature and/or atmospheric pressure, the internal pressure is released in the course of opening the cap from the state in which the cap is closed, and this prevents ink from spilling out. In addition, when the ink tank 700 is refilled with ink from the ink refill container 200 with increased internal pressure, it is more likely that the situation in which ink is supplied beyond the upper limit of the ink level in the ink tank 700 can be avoided.

As illustrated in FIG. 13, the center protrusion 620 in the cap 600 attached state is inserted into the sealing-member through hole **510*h* located at the center portion without being in contact with the plurality of blade portions Fp. This configuration makes it possible to avoid plastic deformation of the blade portions Fp that would be caused when the blade portions Fp are deformed, and thus, the aforementioned functions of the blade portions Fp are likely to be maintained. In the cap 600 attached state, the center protrusion 620 is inserted into the sealing-member through hole 510*h* and pressing the valve member 520 axially in the back end direction D2**. In this state, the outlet valve unit is in the valve open state.

The peripheral wall portion 630 is located between the annular protrusion 610 and the center protrusion 620. The peripheral wall portion 630 is a wall-shaped portion surrounding the center protrusion 620, and a gap is formed between the outer circumferential surface of the center protrusion 620 and the inner circumferential surface of the peripheral wall portion 630. This gap is in the form of a recess the bottom of which in the axial direction is on the inner top-surface portion 601 side of the cap 600. The recess has an opening open toward the ink-outlet forming portion 400. Formation of this gap, when the internal pressure is released and ink is spilled out in the course of opening the cap 600 from the state in which the cap 600 is closed, enables the spilled ink to be kept in the gap by the capillary action. This makes it possible to reduce ink leakage to the outside of the cap 600 and contamination of the ink-outlet forming portion 400. In the present embodiment, this gap is formed such that its width is smaller on the bottom side of the recess than on the opening side, in other words, its width is smaller on the inner top-surface portion 601 side. In other words, its width decreases toward the D1 direction. Note that this gap corresponds to a recess in the present disclosure. The height of the peripheral wall portion 630 is shorter than that of the center protrusion 620. In the present embodiment, the distal end of the peripheral wall portion 630 is configured not to be in contact with the blade portion Fp in the state in which the cap 600 is closed.

Since the ink refill container 200 of the first embodiment described above has the recess configured to hold ink, ink spilled out when the cap 600 is opened can be pulled into and held in the recess by the capillary action. This makes it possible to reduce ink leakage to the outside of the cap 600 and contamination of the ink-outlet forming portion 400.

Since the width of the recess is smaller on the bottom side than on the opening side, the capillary action is more likely to occur at the bottom of the recess. This makes it easier to pull the held ink into the bottom of the recess, making it easier to hold ink in the recess.

B. Second Embodiment

Figure 15:
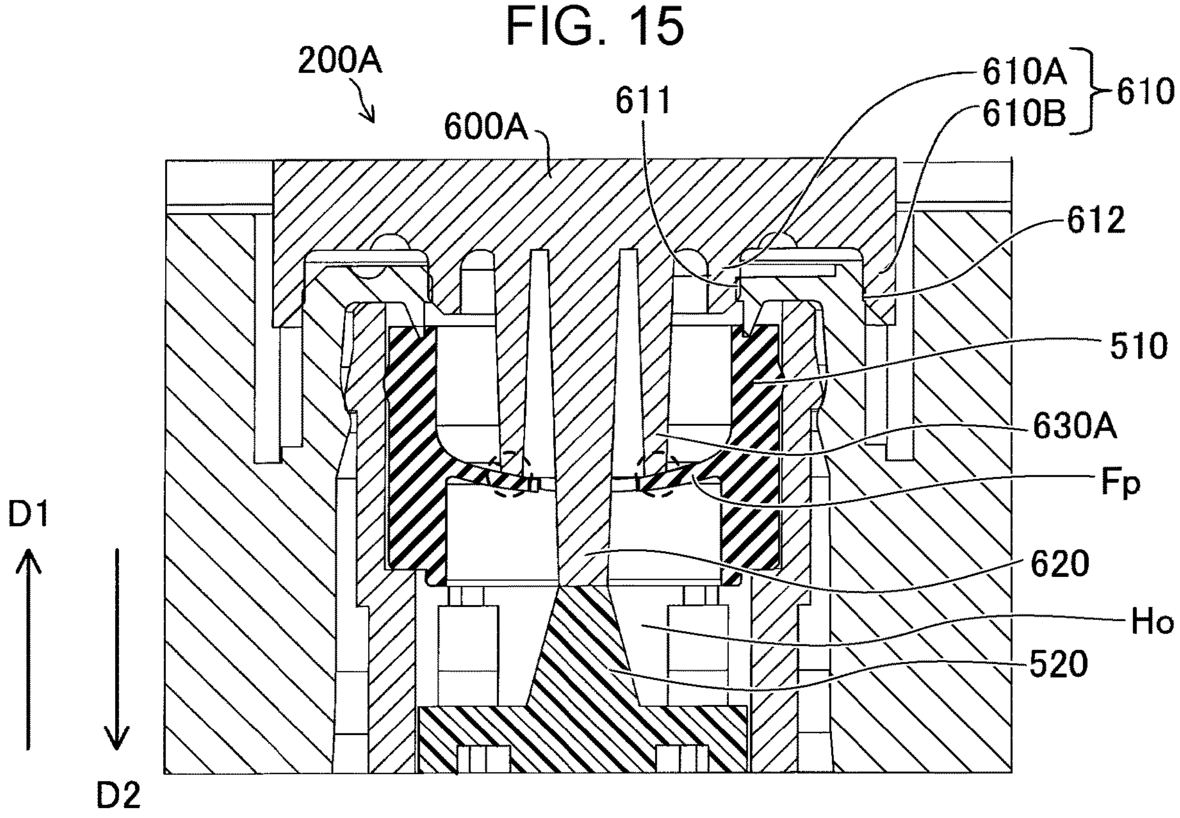
FIG. 15 is a cross-sectional partial view of an ink refill container which is closed with a cap of a second embodiment.

FIG. 15 is a cross-sectional partial view of an ink refill container 200A which is closed with a cap 600A of a second embodiment. As illustrated in FIG. 15, the ink refill container 200A of the second embodiment differs from the ink refill container 200 of the first embodiment in that the ink refill container 200A includes a peripheral wall portion 630A instead of the peripheral wall portion 630. The other constituents of the ink refill container 200A of the second embodiment are the same as those of the ink refill container 200 of the first embodiment. Hence, the same constituents are denoted by the same symbols, and detailed description thereof is omitted.

The cap 600A included in the ink refill container 200A of the second embodiment includes the peripheral wall portion 630A instead of the peripheral wall portion 630. As the circles of dashed line indicate in FIG. 15, the distal end of the peripheral wall portion 630A in the present embodiment is in contact with the blade portions Fp in the cap 600A attached state. Specifically, the length of the peripheral wall portion 630A in the D2 direction is longer than that of the peripheral wall portion 630, and the volume of the peripheral wall portion 630A is larger than that of the peripheral wall portion 630. The peripheral wall portion 630A is configured to come into contact with the blade portions Fp with a force in a degree that does not deform the blade portions Fp. A gap formed between the outer circumferential surface of the center protrusion 620 and the inner circumferential surface of the peripheral wall portion 630A also corresponds to the recess in the present disclosure.

Since the distal end of the peripheral wall portion 630A is in contact with the blade portions Fp in the ink refill container 200A of the second embodiment described above, it is easy to guide the ink spilled out through the gaps Ap of the blade portions Fp into the recess and to hold the ink in the recess. In addition, since the volume of the peripheral wall portion 630A in the present embodiment is larger than that of the peripheral wall portion 630 in the first embodiment, the space that ink can enter between the peripheral wall portion 630A and the inner circumferential surface of the sealing member 510 can be small. This configuration reduces the amount of ink that can enter this space and accordingly reduces the amount of ink spilling out when the cap is opened.

C. Third Embodiment

Figure 16:
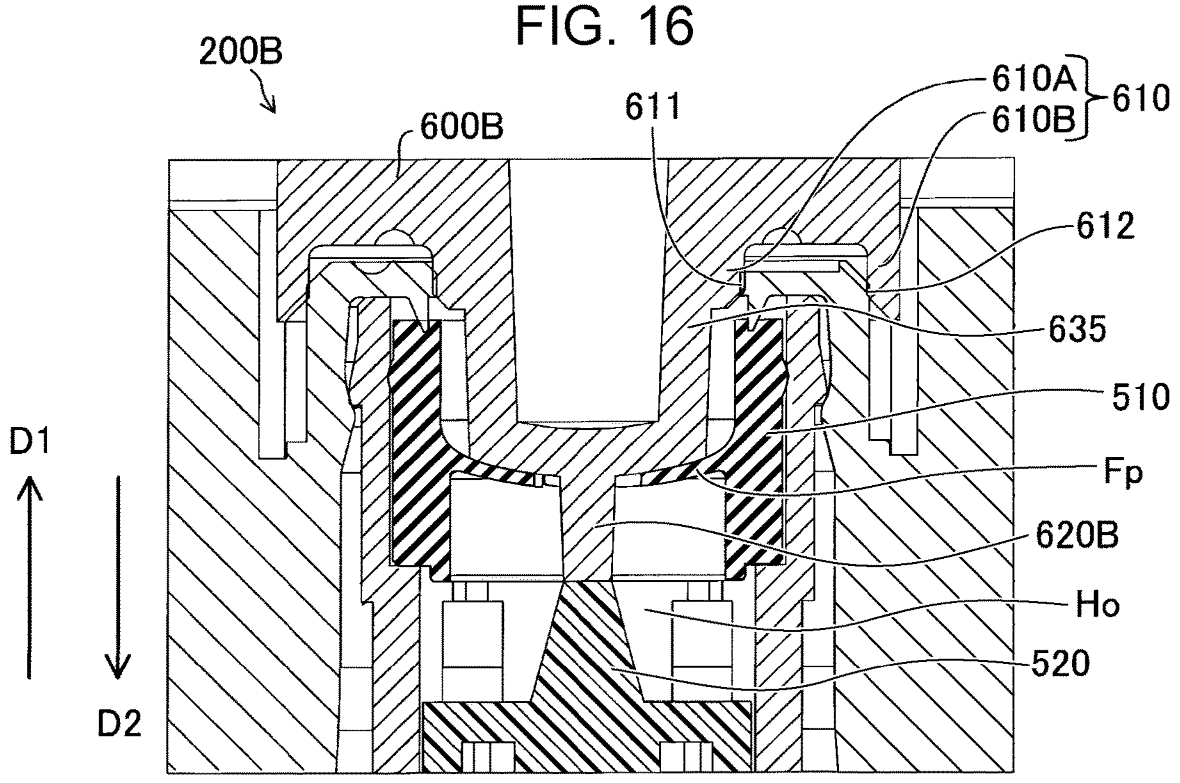
FIG. 16 is a cross-sectional partial view of an ink refill container which is closed with a cap of a third embodiment.

FIG. 16 is a cross-sectional partial view of an ink refill container 200B which is closed with a cap 600B of a third embodiment. As illustrated in FIG. 16, the ink refill container 200B of the third embodiment differs from the ink refill container 200A of the second embodiment in that the ink refill container 200B includes a center protrusion 620B and a large diameter portion 635 instead of the center protrusion 620 and the peripheral wall portion 630A. The other constituents of the ink refill container 200B of the third embodiment are the same as those of the ink refill container 200A of the second embodiment. Hence, the same constituents are denoted by the same symbols, and detailed description thereof is omitted.

The cap 600B included in the ink refill container 200B of the third embodiment includes the center protrusion 620B and the large diameter portion 635 instead of the center protrusion 620 and the peripheral wall portion 630A. In the present embodiment, the center protrusion 620B and the large diameter portion 635 have a unitary structure. As with the center protrusion 620 of the first embodiment, the center protrusion 620B is inserted into the sealing-member through hole 510*h* to press the valve member 520 axially in the back end direction D2 in the cap 600B attached state. The large diameter portion 635 is located axially on the inner top-surface portion 601 side of the center protrusion 620B and has an outer circumferential shape larger than the center protrusion 620B. The distal end of the large diameter portion 635 is configured to be in contact with the blade portions Fp in the cap 600B attached state. In the present embodiment, the large diameter portion 635 has an outer circumferential shape that comes into contact with the blade portions Fp so as to cover the entire slit-shaped gaps Ap illustrated in FIG. 6. The large diameter portion 635 is configured to come into contact with the blade portions Fp with a force in a degree that does not deform the blade portions Fp. In the present embodiment, the center protrusion 620B is solid, and the large diameter portion 635 is hollow. This configuration ensures the rigidity of the center protrusion 620B while mitigating an increase in the weight of the cap. Note that the large diameter portion 635 may be solid.

Since the large diameter portion 635 is in contact with the blade portions Fp in the ink refill container 200B of the third embodiment described above, the space that ink can enter between the large diameter portion 635 and the inner circumferential surface of the sealing member 510 can be small. This configuration reduces the amount of ink that can enter this space and accordingly reduces the amount of ink spilling out when the cap is opened.

In addition, since the large diameter portion 635 is in contact with the blade portions Fp so as to cover the entire slit-shaped gaps Ap, it is possible to reduce ink leakage through the gaps Ap.

D. Fourth Embodiment

Figure 17:
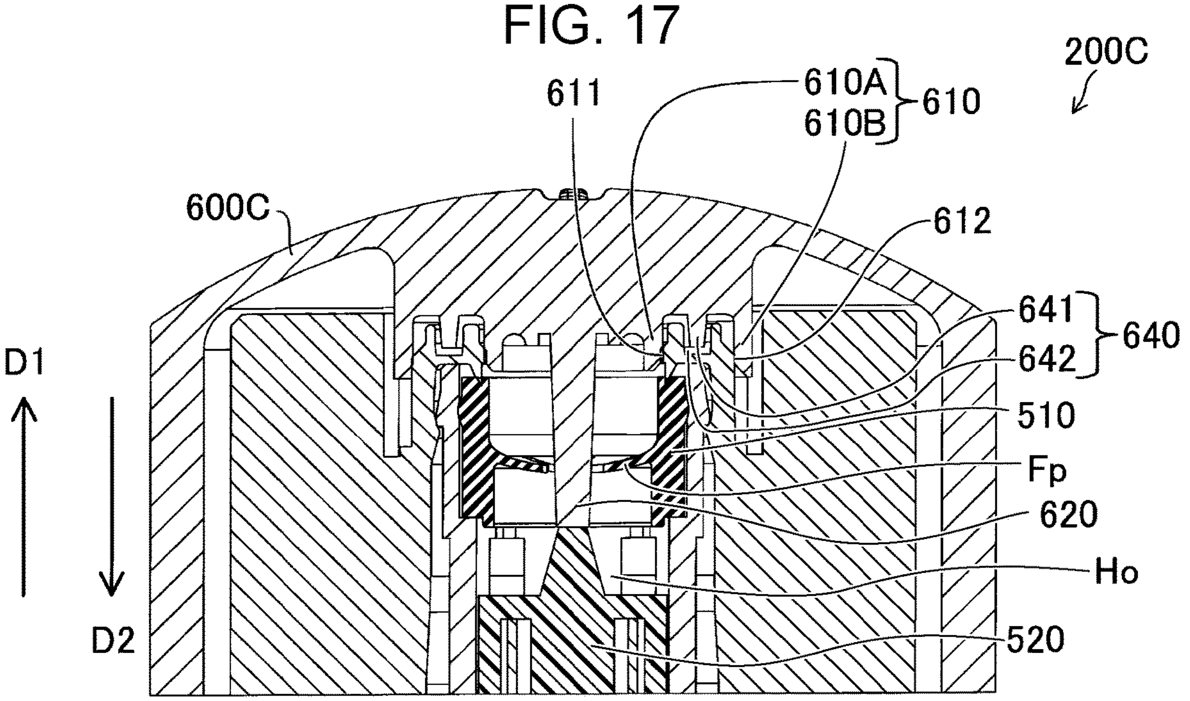
FIG. 17 is a cross-sectional partial view of an ink refill container which is closed with a cap of a fourth embodiment.

FIG. 17 is a cross-sectional partial view of an ink refill container 200C which is closed with a cap 600C of a fourth embodiment. As illustrated in FIG. 17, the ink refill container 200C of the fourth embodiment differs from the ink refill container 200 of the first embodiment in that the ink refill container 200C further includes a fitting portion 640. In the present embodiment, the ink refill container 200C need not include a peripheral wall portion. The other constituents of the ink refill container 200C of the fourth embodiment are the same as those of the ink refill container 200 of the first embodiment. Hence, the same constituents are denoted by the same symbols, and detailed description thereof is omitted.

As illustrated in FIG. 17, in the ink refill container 200C of the fourth embodiment, the fitting portion 640 includes a fitting recess 642 which is a first fitting portion on the ink-outlet forming portion 400 side and a fitting protrusion 641 which is a second fitting portion on the cap side. The fitting protrusion 641 extends downward from the inner top-surface portion 601 of the cap 600C. The fitting recess 642 is located at the upper end of the tubular portion 420 having the ink outlet 460 so as to be open in the end surface. The fitting protrusion 641 and the fitting recess 642 have such a positional relationship that they fit with each other when the cap 600C is closed. The cap 600C also includes an inner annular protrusion 610A and an outer annular protrusion 610B protruding downward from the inner top-surface portion 601. In the cap 600C attached state, the outer annular protrusion 610B is located outside the inner annular protrusion 610A in the radial directions of the tubular portion 420. The inner annular protrusion 610A includes an inner sealing portion 611 configured to be in contact with the inside of the tubular portion 420 in the cap 600C attached state, and the outer annular protrusion 610B includes an outer sealing portion 612 configured to be in contact with the outside of the tubular portion 420 in the cap 600C attached state. The fitting protrusion 641 and the fitting recess 642 are located outside the inner annular protrusion 610A in the radial directions of the tubular portion 420. Further, in the fourth embodiment illustrated in FIG. 17, the fitting protrusion 641 and the fitting recess 642 are located between the inner annular protrusion 610A and the outer annular protrusion 610B in the radial directions mentioned above. Note that the inner annular protrusion 610A and the outer annular protrusion 610B together are referred to as "annular protrusion 610". It is desirable that the annular protrusion 610 include at least the inner annular protrusion 610A, and the annular protrusion 610 may include only the inner annular protrusion 610A. When only the outer annular protrusion 610B is present, it is possible that ink may reach the outside of the tubular portion 420 in the cap attached state. In this case, when the cap 600C is opened, it is possible that the user may touch ink adhering to the upper end of the tubular portion 420.

Figure 18:
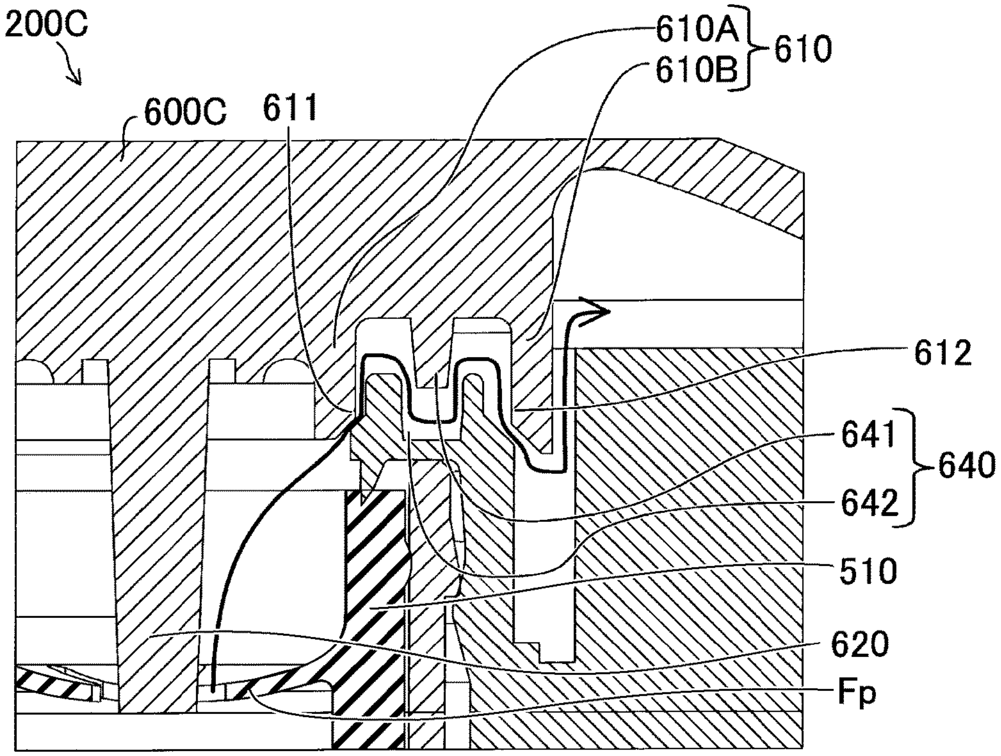
FIG. 18 is a cross-sectional partial view of a fitting portion in the course of opening the cap.

FIG. 18 is a cross-sectional partial view of the fitting portion 640 in the course of opening the cap 600C. When the cap 600C is opened, the seals by the inner sealing portion 611 and the outer sealing portion 612 of the cap are released, and a gap occurs between a lower end portion of the cap 600C and the upper end portion of the ink-outlet forming portion 400. This gap serves as an atmosphere communication path that communicates with the atmosphere. At the fitting portion 640, when the seals by the inner sealing portion 611 and the outer sealing portion 612 of the cap are released, the fitting protrusion 641 and the fitting recess 642 are still engaged. In other words, as for the fitting portion 640, the position at which the fitting portion 640 is disengaged is set higher than the inner sealing portion 611 and the outer sealing portion 612 of the cap. In particular, when the cap 600C includes only the inner annular protrusion 610A, the fitting protrusion 641 and the fitting recess 642 are configured to be still engaged when the seal of the inner sealing portion 611 is released.

Since the ink refill container 200C of the fourth embodiment described above includes the fitting portion 640 located radially outside the inner annular protrusion 610A having the inner sealing portion 611, the atmosphere communication path through which the tubular portion 420 communicates with the atmosphere can be curved and long. Accordingly, this reduces ink spilled out of the ink outlet 460 in the course of opening the cap 600C, leaking outside the cap 600C. In addition, since the fitting portion 640 is located higher than the inner sealing portion 611 and the outer sealing portion 612 of the cap, the fitting portion 640 is disengaged after the seals by the inner sealing portion 611 and the outer sealing portion 612 of the cap are released in the course of removing the cap 600C in the attached state from the ink-outlet forming portion 400. With this configuration, also after the seals by the annular protrusion 610 are released, the fitting portion 640 limits communication with the atmosphere, mitigating sudden pressure release and thereby reducing spilling-out of ink. In addition, since the position at which the fitting portion 640 is disengaged is located higher than the inner sealing portion 611 of the cap, when the cap 600C is removed upward, it is more likely that ink spilling upward is received by the fitting portion 640, in particular, by the fitting protrusion 641.

In addition, since this configuration includes the fitting recess 642 that is open in the upper end surface of the tubular portion 420, when the ink outlet 460 is facing upward, the ink spilled out of the ink outlet 460 is likely to be held on the fitting recess 642 so as to face upward. Thus, it is possible to reduce the ink spilled out when the cap 600 is opened and leaking outside from the lower end of the cap 600C. Since this configuration includes the fitting protrusion 641 extending downward from the inner top-surface portion 601 of the cap 600C, the ink spilled out when the cap 600C is opened can be blocked by the fitting protrusion 641, and this reduces ink leakage from the lower end of the cap 600 to the outside.

E. Fifth Embodiment

FIG. 19 is a cross-sectional partial view of an ink refill container 200D which is closed with a cap 600D of a fifth embodiment. The ink refill container 200D of the fifth embodiment differs from the ink refill container 200 of the first embodiment in that the cap 600D further includes a step portion 650 in the inner side-surface portion 602. The other constituents of the ink refill container 200D of the fifth embodiment are the same as those of the ink refill container 200 of the first embodiment. Hence, the same constituents are denoted by the same symbols, and detailed description thereof is omitted.

As illustrated in FIG. 19, the cap 600D in the present embodiment includes the step portion 650 in the inner side-surface portion 602. The step portion 650 in the inner side-surface portion 602 is away from the ink-outlet forming portion 400. In the present embodiment, the step portion 650 is formed such that the inner circumferential diameter of the cap 600D increases stepwise toward the D2 direction. Forming the step portion 650 forms corners Cn in the inner side-surface portion 602 of the cap 600D. The corners Cn are indicated in FIG. 19 by surrounding them with circles of dashed lines. With this configuration, even when ink is spilled out inside the cap 600D when the cap 600D is opened, the ink can be held at the corners Cn by the capillary action. Thus, it is possible to reduces ink leakage from the lower end of the cap 600D to the outside of the cap 600D. This step portion 650 corresponds to an ink holding portion in the present disclosure. Note that the position of the step portion 650 is not limited to in the inner side-surface portion 602 of the cap 600. The step portion 650 may be formed in the inner top-surface portion 601 of the cap 600.

Since the ink refill container 200D of the fifth embodiment described above includes the step portion 650, the ink spilled out in the cap 600D can be held in the step portion 650. Thus, it is possible to reduce ink leakage from the lower end of the cap 600D to the outside. In addition, since the step portion 650 is away from the ink-outlet forming portion 400 in the cap 600D attached state, it is possible to reduce the ink held in the step portion 650, adhering to the ink-outlet forming portion 400. In addition, sine ink is held in the step portion 650, the held ink makes it easy for the user to recognize the color of ink. This configuration makes it possible to prevent a container body 300 from receiving a cap 600D with adhering ink the color of which differs from the color of ink stored in the container body 300. This prevents mixing of different colors of ink.

F. Other Embodiments (F1) Although the sealing member 510 includes the six blade portions Fp separated by the six slit-shaped gaps Ap extending radially from the center portion in the above embodiments, the present disclosure is not limited to this configuration. A configuration in which the sealing member 510 does not include the blade portions Fp and includes only the sealing-member through hole 510*h* is possible.

(F2) Although the recess in the above first embodiment is the gap between the center protrusion 620 and the peripheral wall portion 630, the present disclosure is not limited to this configuration. FIG. 20 is a perspective view of a cap 600E of another embodiment. As illustrated in FIG. 20, the ink refill container may include the cap 600E including ribs Rb located radially between the center protrusion 620 and the annular protrusion 610, instead of the peripheral wall portion 630. The height of each rib Rb is shorter than the height of the center protrusion 620. In this case, the recess corresponds to the gaps between the plurality of ribs Rb. In addition, each rib Rb may be radially away from the center protrusion 620. In this configuration, the recess corresponds to not only the gaps between the plurality of ribs Rb but also gaps between the center protrusion 620 and the plurality of ribs Rb. An ink refill container including the cap 600E with this configuration also provides effects the same as or similar to those of the ink refill container 200 of the first embodiment described above.

Figure 21:
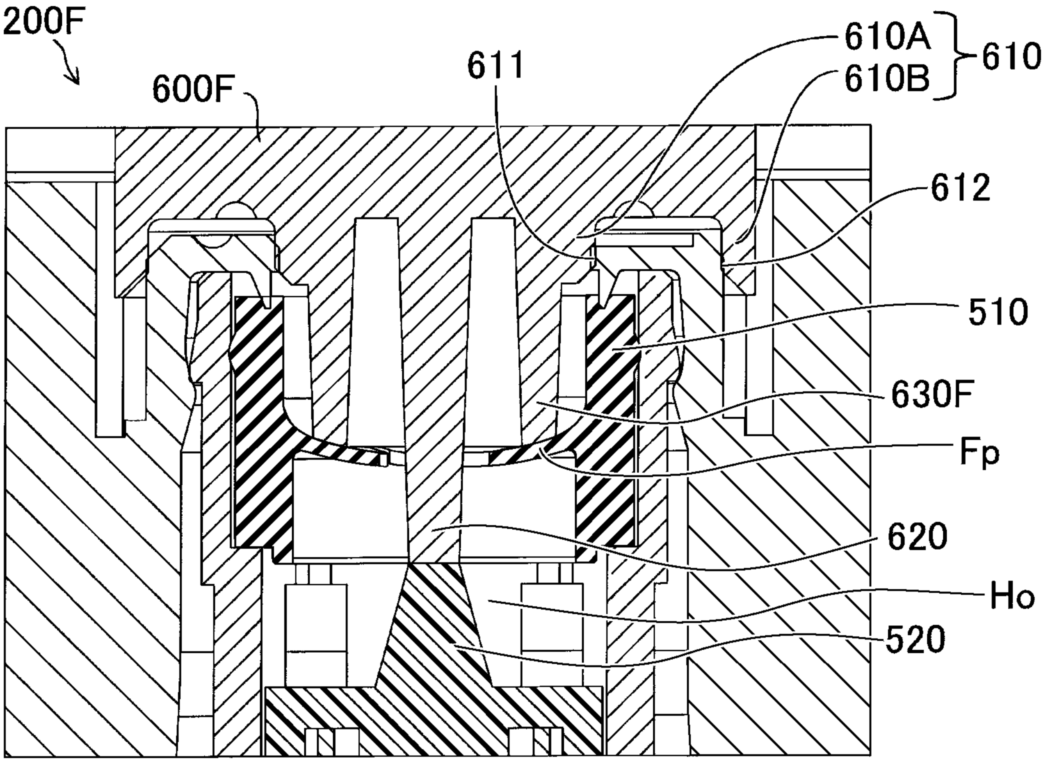
FIG. 21 is a cross-sectional partial view of an ink refill container which is closed with a cap of another embodiment.

(F3) FIG. 21 is a cross-sectional partial view of an ink refill container 200F which is closed with a cap 600F of another embodiment. As illustrated in FIG. 21, the cap 600F includes, instead of the peripheral wall portion 630A, a peripheral wall portion 630F which is thicker than the peripheral wall portion 630A. The outer circumferential shape of the peripheral wall portion 630F is larger than that of the peripheral wall portion 630A. In the ink refill container 200F including the cap 600F with this configuration, the space that ink can enter, located between the peripheral wall portion 630F of the cap 600F and the inner circumferential surface of the sealing member 510 can be smaller. This configuration reduces the amount of ink that can enter this space and further reduces the amount of ink spilling out when the cap 600F is opened.

(F4) Although the large diameter portion 635 in the above third embodiment has an outer circumferential shape that comes into contact with the blade portions Fp so as to cover the entire slit-shaped gaps Ap, the present disclosure is not limited to this configuration. The large diameter portion 635 may have an outer circumferential shape that comes into contact with the blade portions Fp so as to cover part of the slit-shaped gaps Ap.

(F5) Although the ink refill container 200C in the above fourth embodiment includes, as the fitting portion 640, the fitting protrusion 641 extending downward from the inner top-surface portion 601 of the cap 600 and the fitting recess 642 formed so as to be open in the upper end surface of the tubular portion 420 having the ink outlet 460, the present disclosure is not limited to this configuration. The ink refill container 200 may include, as a fitting portion 640, a fitting recess located in the inner top-surface portion 601 of the cap and open in the D2 direction and a fitting protrusion protruding in the D1 direction from the upper end of the tubular portion 420 having the ink outlet 460. Also with the ink refill container of this configuration, after the seals by the annular protrusion 610 are released, the fitting portion limits communication with the atmosphere, mitigating sudden pressure release and thereby reducing spilling-out of ink. In addition, since the position at which the fitting portion is disengaged is located higher the inner sealing portion 611, when the cap is removed upward, it is more likely that ink spilling upward is received by the fitting portion.

(F6) Although the ink refill container 200D in the above fifth embodiment includes the step portion 650 as an ink holding portion in the inner top-surface portion 601 or the inner side-surface portion 602 of the cap 600D, the present disclosure is not limited to this configuration. The ink refill container may include, as an ink holding portion, a groove portion formed in a circumferential direction in the inner top-surface portion or the inner side-surface portion of the cap. The ink refill container of this configuration is also capable of holding ink in the groove portion by the capillary action and provides effects the same as or similar to those of the above ink refill container 200D of the fifth embodiment.

G. Other Configurations

The present disclosure is not limited to the foregoing embodiments and can be implemented with various configurations within a scope not departing from the spirit. For example, the technical features of the embodiments corresponding to the technical features of the configurations described below can be replaced or combined as appropriate to solve some or all of the foregoing problems or to achieve some or all of the foregoing effects. Unless technical features are explained in the present specification as essential ones, they can be omitted as appropriate.

(1) A first aspect of the present disclosure provides an ink refill container for refilling a printer with ink. The ink refill container includes: a container body configured to store ink; an ink-outlet forming portion connected to the container body and including a tubular portion including an ink outlet that enables the ink to flow out and a valve located at the ink outlet; and a cap configured to be detachably attached to the ink-outlet forming portion, the cap includes an inner top-surface portion configured to face the ink outlet in an attached state in which the cap is attached to the ink-outlet forming portion, when a direction parallel to a center axis of the ink refill container in the attached state is defined as an axial direction, the inner top-surface portion includes a center protrusion protruding from the inner top-surface portion toward the ink-outlet forming portion in the axial direction and configured to push the valve to open the valve in the attached state, an annular protrusion located outside the center protrusion in radial directions with respect to the center protrusion, the annular protrusion, in the attached state, protruding from the inner top-surface portion toward the ink-outlet forming portion in the axial direction and including a cap-side sealing portion configured to be in contact with the tubular portion to seal the tubular portion, and at least one of an annular peripheral wall portion and a plurality of ribs, the peripheral wall portion being located between the center protrusion and the annular protrusion in the radial directions and having a height lower than a distal end of the center protrusion, the plurality of ribs being located between the center protrusion and the cap-side sealing portion in the radial directions and having a height lower than the distal end of the center protrusion, and a gap between the center protrusion and the peripheral wall portion or each of gaps between the ribs has a shape of a recess, and the recess has a bottom on the inner top-surface portion side and an opening open toward the ink-outlet forming portion and is configured to hold the ink. Since this configuration includes a recess configured to hold ink, ink spilled out when the cap is opened is pulled into and held in the recess by the capillary action. This makes it possible to reduce ink leakage to the outside of the cap and contamination of the ink-outlet forming portion.

(2) In the above aspect, width of the recess may be smaller on the bottom side than on the opening side. Since the width of the recess is smaller on the bottom side than on the opening side in this configuration, the capillary action is more likely to occur at the bottom of the recess. This configuration makes it easier to pull the held ink into the bottom of the recess, making it easier to hold ink in the recess.

(3) In the above aspect, the valve may include a valve member, a sealing member configured to be in contact with the valve member in a valve closed state of the valve, and a spring member configured to urge the valve member toward the sealing member in the valve closed state, the sealing member may include a cylindrical portion extending in the axial direction and an elastic membrane portion extending from an inner circumferential wall of the cylindrical portion toward the center axis, having a through hole at center corresponding to the center axis, and separated by slits extending from the through hole toward the inner circumferential wall in the radial directions, the recess may be located between the center protrusion and the peripheral wall portion in the radial directions, the center protrusion in the attached state may extend through the through hole and push the valve member to put the valve in a valve open state, and the peripheral wall portion in the attached state may be in contact with at least part of the elastic membrane portion. Since the peripheral wall portion of the cap is in contact with the elastic membrane portion in this configuration, the volume of the space between the peripheral wall portion of the cap and the cylindrical portion of the sealing member can be small, and this reduces the amount of ink flowing out via the slits into the space. Thus, this configuration is capable of reducing the amount of ink spilled out when the cap is opened.

(4) A second aspect of the present disclosure provides an ink refill container for refilling a printer with ink. The ink refill container includes: a container body configured to store ink; an ink-outlet forming portion connected to the container body and including a tubular portion having an ink outlet that enables the ink to flow out and a valve located at the ink outlet; and a cap configured to be detachably attached to the ink-outlet forming portion, the cap includes an inner top-surface portion configured to face the ink outlet in an attached state in which the cap is attached to the ink-outlet forming portion, when a direction parallel to a center axis of the ink refill container in the attached state is defined as an axial direction, the inner top-surface portion includes a center protrusion configured to push the valve to open the valve in the attached state and a large diameter portion located on the inner top-surface portion side relative to a distal end portion of the center protrusion in the axial direction and having an outer circumferential shape larger than the center protrusion, the valve includes a valve member, a sealing member configured to be in contact with the valve member in a valve closed state of the valve, and a spring member configured to urge the valve member toward the sealing member in the valve closed state, the sealing member includes a cylindrical portion extending in the axial direction and an elastic membrane portion extending from an inner circumferential wall of the cylindrical portion toward the center axis, having a through hole at center corresponding to the center axis, and separated by slits extending from the through hole toward the inner circumferential wall in radial directions, the center protrusion in the attached state extends through the through hole and pushes the valve member to put the valve in a valve open state, and a distal end of the large diameter portion in the attached state is in contact with at least part of the elastic membrane portion. Since the large diameter portion of the cap is in contact with the elastic membrane portion in this configuration, the volume of the space between the large diameter portion of the cap and the cylindrical portion of the sealing member can be small, and this reduces the amount of ink flowing out via the slits into the space. Thus, this configuration is capable of reducing the amount of ink spilled out when the cap is opened.

(5) In the above aspect, in the attached state, the distal end of the large diameter portion may be in contact with the elastic membrane portion so as to cover the entire slits. Since the large diameter portion of the cap covers an area larger than the slits of the elastic membrane portion in this configuration, the amount of ink flowing out via the slits into the space between the large diameter portion of the cap and the cylindrical portion of the sealing member can be small. Thus, this configuration is capable of reducing the amount of ink spilled out when the cap is opened.

(6) A third aspect of the present disclosure provides an ink refill container for refilling a printer with ink. The ink refill container includes: a container body configured to store ink; an ink-outlet forming portion connected to the container body and including a tubular portion having an ink outlet that enables the ink to flow out and a valve located in the ink outlet; and a cap configured to be detachably attached to the ink-outlet forming portion and configured to be removed upward in an attached state in which the cap is attached to the ink-outlet forming portion and in a state in which the ink outlet faces upward, the cap includes an inner top-surface portion configured to face the ink outlet in the attached state in which the cap is attached to the ink-outlet forming portion and an inner annular protrusion protruding from the inner top-surface portion downward and including an inner sealing portion configured to be in contact with an inside of the tubular portion in the attached state and in the state in which the ink outlet faces upward, the ink-outlet forming portion includes a first fitting portion recessed or protruding from an upper end surface of the tubular portion in the state in which the ink outlet faces upward, and the cap includes a second fitting portion configured to fit into the first fitting portion in the attached state, and the second fitting portion is located outside the inner annular protrusion in radial directions of the tubular portion. Since the cap in this configuration includes the second fitting portion located radially outside the inner annular protrusion having the inner sealing portion, the atmosphere communication path that causes the inside of the tubular portion to communicate the atmosphere can be curved and long, and thereby reducing the ink spilled out of the ink outlet in the course of opening the cap, leaking outside the cap.

(7) In the above aspect, the first fitting portion may be a fitting recess open in the upper end surface of the tubular portion, and the second fitting portion may be a fitting protrusion extending downward from the inner top-surface portion. Since the fitting portion in this configuration includes the fitting recess and the fitting protrusion, the atmosphere communication path can be curved and long, thereby reducing the ink spilled out in the course of opening the cap, leaking outside the cap. In addition, since this configuration includes the fitting recess that is open in the upper end surface of the tubular portion, when the ink outlet is facing upward, the ink spilled out of the ink outlet is likely to be held in the recess so as to face upward. Thus, it is possible to reduce the ink spilled out when the cap is opened, leaking outside from the lower end of the cap. Since this configuration includes the fitting protrusion extending downward from the inner top-surface portion of the cap, the ink spilled out when the cap is opened can be blocked by the fitting protrusion, thereby reducing ink leakage to the outside of the cap from the lower end of the cap.

(8) In the above aspect, the cap may include an ink holding portion located away from the ink-outlet forming portion, in at least one of the inner top-surface portion and a tubular inner side-surface portion extending in a direction intersecting the inner top-surface portion. Since this configuration includes the ink holding portion, the ink holding portion can hold the ink spilled out in the cap, thereby reducing ink leakage from the lower end of the cap to the outside.

(9) A fourth aspect of the present disclosure provides an ink refill container for refilling a printer with ink. The ink refill container includes: a container body configured to store ink; an ink-outlet forming portion connected to the container body and including a tubular portion having an ink outlet that enables the ink to flow out and a valve located at the ink outlet; and a cap configured to be detachably attached to the ink-outlet forming portion, the cap includes an inner top-surface portion configured to face the ink outlet in an attached state in which the cap is attached to the ink-outlet forming portion and a tubular inner side-surface portion extending in a direction intersecting the inner top-surface portion, when a direction parallel to a center axis of the ink refill container in the attached state is defined as an axial direction, the inner top-surface portion includes a center protrusion configured to push the valve to open the valve in the attached state and an annular protrusion located outside the center protrusion in radial directions with respect to the center protrusion, the annular protrusion, in the attached state, protruding from the inner top-surface portion toward the ink-outlet forming portion in the axial direction and including a cap-side sealing portion configured to be in contact with the tubular portion to seal the tubular portion, and an ink holding portion away from the ink-outlet forming portion is located in at least one of the inner side-surface portion and a portion of the inner top-surface portion, the portion being located radially outside the annular protrusion. Since this configuration includes the ink holding portion, the ink holding portion can hold the ink spilled out in the cap, thereby reducing ink leakage from the lower end of the cap to the outside. In addition, since the ink holding portion is away from the ink-outlet forming portion in the cap attached state, it is possible to reduce the ink held in the ink holding portion, adhering to the ink-outlet forming portion. In addition, since ink is held in the ink holding portion, the held ink makes it easy for the user to recognize the color of ink. This configuration makes it possible to prevent a container body from receiving a cap with adhering ink the color of which differs from the color of ink stored in the container body, which prevents mixing of different colors of ink.

(10) In the above aspect, the cap may include at least one of a groove portion and a step portion as the ink holding portion. Since this configuration includes at least one of the groove portion and the step portion as an ink holding portion, the capillary action that occurs in a corner of the step portion or a groove pulls and holds ink spilled out when the cap is opened, which reduces ink leaking out from the lower end of the cap to the outside.

The present disclosure can be implemented in aspects such as a method of manufacturing an ink refill container, other than the aspects described above.

What is claimed is:

1. An ink refill container for refilling a printer with ink, comprising:

a container body configured to store ink;

an ink-outlet forming portion connected to the container body and including a tubular portion having an ink outlet that enables the ink to flow out and a valve located at the ink outlet; and a cap configured to be detachably attached to the ink-outlet forming portion, wherein the cap includes an inner top-surface portion configured to face the ink outlet in an attached state in which the cap is attached to the ink-outlet forming portion, when a direction parallel to a center axis of the ink refill container in the attached state is defined as an axial direction, the inner top-surface portion includes a center protrusion protruding from the inner top-surface portion toward the ink-outlet forming portion in the axial direction and configured to push the valve to open the valve in the attached state, an annular protrusion located outside the center protrusion in radial directions with respect to the center protrusion, the annular protrusion, in the attached state, protruding from the inner top-surface portion toward the ink-outlet forming portion in the axial direction and including a cap-side sealing portion configured to be in contact with the tubular portion to seal the tubular portion, and at least one of an annular peripheral wall portion and a plurality of ribs, the peripheral wall portion being located between the center protrusion and the annular protrusion in the radial directions and having a height lower than a distal end of the center protrusion, the plurality of ribs being located between the center protrusion and the cap-side sealing portion in the radial directions and having a height lower than the distal end of the center protrusion, and a gap between the center protrusion and the peripheral wall portion or each of gaps between the ribs has a shape of a recess, and the recess has a bottom on the inner top-surface portion side and an opening open toward the ink-outlet forming portion and is configured to hold the ink.

2. The ink refill container according to claim 1, wherein width of the recess is smaller on the bottom side than on the opening side.

3. The ink refill container according to claim 1, the valve includes a valve member, a sealing member configured to be in contact with the valve member in a valve closed state of the valve, and a spring member configured to urge the valve member toward the sealing member in the valve closed state, the sealing member includes a cylindrical portion extending in the axial direction and an elastic membrane portion extending from an inner circumferential wall of the cylindrical portion toward the center axis, having a through hole at center corresponding to the center axis, and separated by slits extending from the through hole toward the inner circumferential wall in the radial directions, the recess is located between the center protrusion and the peripheral wall portion in the radial directions, the center protrusion in the attached state extends through the through hole and pushes the valve member to put the valve in a valve open state, and the peripheral wall portion in the attached state is in contact with at least part of the elastic membrane portion.

4. The ink refill container according to claim 1, wherein the cap includes an ink holding portion located away from the ink-outlet forming portion, in at least one of the inner top-surface portion and a tubular inner side-surface portion extending in a direction intersecting the inner top-surface portion.

5. An ink refill container for refilling a printer with ink, comprising:

a container body configured to store ink;

an ink-outlet forming portion connected to the container body and including a tubular portion having an ink outlet that enables the ink to flow out and a valve located at the ink outlet; and a cap configured to be detachably attached to the ink-outlet forming portion, wherein the cap includes an inner top-surface portion configured to face the ink outlet in an attached state in which the cap is attached to the ink-outlet forming portion and a tubular inner side-surface portion extending in a direction intersecting the inner top-surface portion, when a direction parallel to a center axis of the ink refill container in the attached state is defined as an axial direction, the inner top-surface portion includes a center protrusion configured to push the valve to open the valve in the attached state and an annular protrusion located outside the center protrusion in radial directions with respect to the center protrusion, the annular protrusion, in the attached state, protruding from the inner top-surface portion toward the ink-outlet forming portion in the axial direction and including a cap-side sealing portion configured to be in contact with the tubular portion to seal the tubular portion, and an ink holding portion away from the ink-outlet forming portion is located in at least one of the inner side-surface portion and a portion of the inner top-surface portion, the portion being located radially outside the annular protrusion, wherein the cap includes at least one of a groove portion and a step portion as the ink holding portion.

6. An ink refill container for refilling a printer with ink, comprising:

a container body configured to store ink;

an ink-outlet forming portion connected to the container body and including a tubular portion having an ink outlet that enables the ink to flow out and a valve located in the ink outlet; and a cap configured to be detachably attached to the ink-outlet forming portion and configured to be removed upward in an attached state in which the cap is attached to the ink-outlet forming portion and in a state in which the ink outlet faces upward, wherein the cap includes an inner top-surface portion configured to face the ink outlet in the attached state in which the cap is attached to the ink-outlet forming portion and an inner annular protrusion protruding from the inner top-surface portion downward and including an inner sealing portion configured to be in contact with an inside of the tubular portion in the attached state and in the state in which the ink outlet faces upward, the ink-outlet forming portion includes a first fitting portion recessed or protruding from an upper end surface of the tubular portion in the state in which the ink outlet faces upward, and the cap includes a second fitting portion configured to fit into the first fitting portion in the attached state, and the second fitting portion is located outside the inner annular protrusion in radial directions of the tubular portion.

7. The ink refill container according to claim 6, wherein the first fitting portion is a fitting recess open in the upper end surface of the tubular portion, and the second fitting portion is a fitting protrusion extending downward from the inner top-surface portion.

8. An ink refill container for refilling a printer with ink, comprising:

a container body configured to store ink;

an ink-outlet forming portion connected to the container body and including a tubular portion having an ink outlet that enables the ink to flow out and a valve located at the ink outlet; and a cap configured to be detachably attached to the ink-outlet forming portion, wherein the cap includes an inner top-surface portion configured to face the ink outlet in an attached state in which the cap is attached to the ink-outlet forming portion, when a direction parallel to a center axis of the ink refill container in the attached state is defined as an axial direction, the inner top-surface portion includes a center protrusion configured to push the valve to open the valve in the attached state and a large diameter portion located on the inner top-surface portion side relative to a distal end portion of the center protrusion in the axial direction and having an outer circumferential shape larger than the center protrusion, the valve includes a valve member, a sealing member configured to be in contact with the valve member in a valve closed state of the valve, and a spring member configured to urge the valve member toward the sealing member in the valve closed state, the sealing member includes a cylindrical portion extending in the axial direction and an elastic membrane portion extending from an inner circumferential wall of the cylindrical portion toward the center axis, having a through hole at center corresponding to the center axis, and separated by slits extending from the through hole toward the inner circumferential wall in radial directions, the center protrusion in the attached state extends through the through hole and pushes the valve member to put the valve in a valve open state, and a distal end of the large diameter portion in the attached state is in contact with at least part of the elastic membrane portion.

9. The ink refill container according to claim 8, wherein in the attached state, the distal end of the large diameter portion is in contact with the elastic membrane portion so as to cover the entire slits.

* * * * *